US012488232B2

(12) United States Patent
Rangu et al.

(10) Patent No.: US 12,488,232 B2
(45) Date of Patent: Dec. 2, 2025

(54) HIGH-LEVEL SYNTAX FOR PRIORITY SIGNALING IN NEURAL NETWORK COMPRESSION

(71) Applicant: Nokia Technologies Oy, Espoo (FI)

(72) Inventors: Goutham Rangu, Tampere (FI); Hamed Rezazadegan Tavakoli, Espoo (FI); Francesco Cricri, Tampere (FI); Miska Matias Hannuksela, Tampere (FI); Emre Aksu, Tampere (FI)

(73) Assignee: Nokia Technologies Oy, Espoo (FI)

( * ) Notice: Subject to any disclaimer, the term of this patent is extended or adjusted under 35 U.S.C. 154(b) by 946 days.

(21) Appl. No.: 17/060,658

(22) Filed: Oct. 1, 2020

(65) Prior Publication Data

US 2021/0103813 A1    Apr. 8, 2021

Related U.S. Application Data

(60) Provisional application No. 62/909,495, filed on Oct. 2, 2019.

(51) Int. Cl.
    *G06N 3/08*   (2023.01)
    *G06N 3/04*   (2023.01)
(52) U.S. Cl.
    CPC ............... *G06N 3/08* (2013.01); *G06N 3/04* (2013.01)
(58) Field of Classification Search
    CPC .......... G06N 3/08; G06N 3/04; G06N 3/0455; G06N 3/0495; G06N 3/082; G06N 3/063;
    (Continued)

(56) References Cited

U.S. PATENT DOCUMENTS 10,229,356 B1 *  3/2019  Liu ..................... G10L 15/16
10,832,139 B2 * 11/2020  Yan ..................... G06N 3/082
(Continued)

FOREIGN PATENT DOCUMENTS

CN      110163370 A      8/2019
EP        3767549 A1     1/2021
(Continued)

OTHER PUBLICATIONS

Georgiadis, G. (2019). Accelerating convolutional neural networks via activation map compression. 2019 IEEE/CVF Conference on Computer Vision and Pattern Recognition (CVPR). https://doi.org/10.1109/cvpr.2019.00725 (Year: 2019).*

(Continued)

*Primary Examiner* — David Yi
*Assistant Examiner* — Nicholas Shine
(74) *Attorney, Agent, or Firm* — McCarter & English, LLP; Joseph C. Drish

(57) ABSTRACT

Apparatuses, methods, and computer programs for compressing a neural network are disclosed. An apparatus includes at least one processor; and at least one non-transitory memory including computer program code, the memory and the computer program code configured to, with the at least one processor, cause the apparatus to: receive information from a second device, where the information comprises at least one parameter configured to be used for compression of a neural network, where the at least one parameter is in regard to at least one first aspect or task of the neural network; and compress the neural network, where the neural network is compressed based, at least partially, upon the at least one parameter received from the second device. The apparatus may also receive a compressed neural network from the second device, and further compress the compressed neural network based on the information.

33 Claims, 13 Drawing Sheets

(58) Field of Classification Search
CPC ........ G06N 3/0895; G06N 3/09; G06N 3/091;
G06N 3/092; G06N 3/094; G06N 3/096;
G06N 3/098; G06N 3/0985; G06N
3/0464; G06N 3/0475; G06N 3/0499;
H04N 19/147; H04N 19/156; H04N
19/503; H04N 19/52; H04N 19/593;
H04N 19/597; H04N 19/463; H04N
19/50; H04N 19/70
See application file for complete search history.

(56) References Cited

U.S. PATENT DOCUMENTS

| | | | |
|---|---|---|---|
| 11,423,311 B2* | 8/2022 | Brothers | G06N 3/082 |
| 2016/0217369 A1 | 7/2016 | Annapureddy et al. | |
| 2017/0076195 A1 | 3/2017 | Yang et al. | 3/4 |
| 2018/0176576 A1* | 6/2018 | Rippel | G06V 20/52 |
| 2019/0130272 A1 | 5/2019 | Yosinski et al. | |
| 2019/0318245 A1* | 10/2019 | Song | G06F 9/5061 |
| 2020/0104717 A1* | 4/2020 | Alistarh | G06N 3/045 |
| 2020/0242467 A1* | 7/2020 | Cao | G06N 20/10 |
| 2020/0272905 A1* | 8/2020 | Saripalli | G06N 3/082 |

FOREIGN PATENT DOCUMENTS

| | | |
|---|---|---|
| WO | WO-2018121282 A1 | 7/2018 |
| WO | WO-2019007477 A1 | 1/2019 |

OTHER PUBLICATIONS

Hin, T. C. L., Shen, I.-C., Sato, I., & Igarashi, T. (Jun. 27, 2019). Interactive subspace exploration on Generative Image Modelling. arXiv.org. https://arxiv.org/abs/1906.09840v2 (Year: 2019).*

Kim et al., "Efficient Neural Network Compression," Apr. 2019, https://arxiv.org/abs/1811.12781 (Year: 2019).*

Chmiel et al., Feature Map Transform Coding for Energy-Efficient CNN Inference., 2019, https://arxiv.org/abs/1905.10830 (Year: 2019).*

Sicong Liu et al. "On-Demand Deep Model Compression for Mobile Devices" Mobile Systems, Applications and Services, ACM, 2 Penn Plaza, Suite 701 New York, NY Jun. 10, 2018 pp. 389-400.

Chen Changan et al. "Constraint-Aware Deep Neural Network Compression" Oct. 7, 2018, Sat 2015 18$^{th}$ International Conference, Austin TX, USA Sep. 24-27, 2015 pp. 409-424.

Chen Jiasi et al. "Deep Learning with Edge Computing: A Review" Proceedings of the IEEE, IEEE, New York, USA vol. 107, No. 8, Aug. 1, 2019, pp. 1655-1674.

* cited by examiner

HIGH-LEVEL SYNTAX FOR PRIORITY SIGNALING IN NEURAL NETWORK COMPRESSION

RELATED APPLICATION

This application claims priority to U.S. Provisional Application No. 62/909,495, filed Oct. 2, 2019, which is hereby incorporated by reference in its entirety.

TECHNICAL FIELD

The examples and non-limiting embodiments relate generally to computing and, more particularly, to a neural network.

BACKGROUND

It is known to perform video coding and decoding.

SUMMARY

In accordance with an aspect, an apparatus includes at least one processor; and at least one non-transitory memory including computer program code, the at least one memory and the computer program code configured to, with the at least one processor, cause the apparatus to: receive information from a second device, where the information comprises at least one parameter configured to be used for compression of a neural network, where the at least one parameter is in regard to at least one first aspect or task of the neural network; and compress the neural network, where the neural network is compressed based, at least partially, upon the at least one parameter received from the second device.

In accordance with an aspect, an apparatus includes at least one processor; and at least one non-transitory memory including computer program code, the at least one memory and the computer program code configured to, with the at least one processor, cause the apparatus to: transmit information from the apparatus to a second device, where the information comprises at least one parameter configured to be used for compression of a neural network, where the at least one parameter is in regard to at least one first aspect or task of the neural network; and receive a compressed neural network from the second device, where the compressed neural network has been compressed based on the at least one parameter.

In accordance with an aspect, a method includes receiving information from a second device, where the information comprises at least one parameter configured to be used for compression of a neural network, where the at least one parameter is in regard to at least one first aspect or task of the neural network; and compressing the neural network, where the neural network is compressed based, at least partially, upon the at least one parameter received from the second device.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 1:
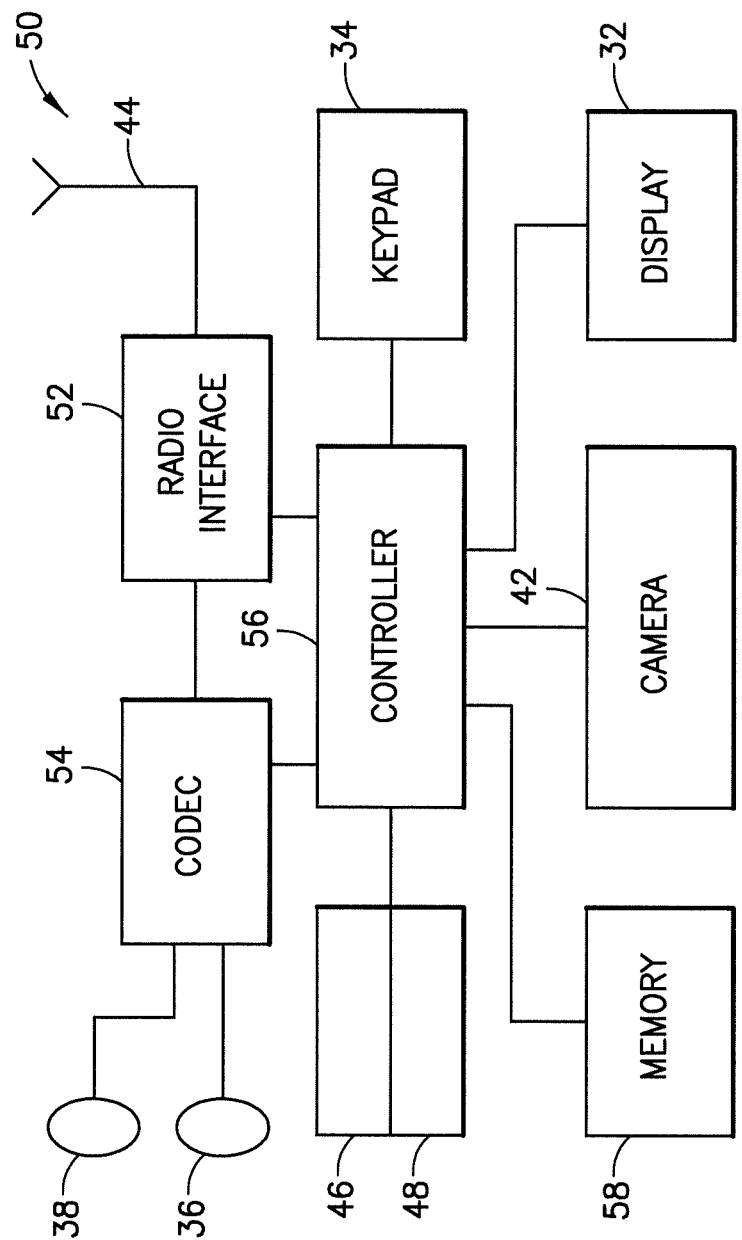
FIG. 1 shows schematically an electronic device employing embodiments of the examples described herein.

The following acronyms and abbreviations that may be found in the specification and/or the drawing figures are defined as follows:

3GPP 3rd Generation Partnership Project
4G fourth generation of broadband cellular network technology
5G fifth generation cellular network technology
802.x family of IEEE standards dealing with local area networks and metropolitan area networks
a.k.a. also known as
ASIC application specific circuit
CDMA code-division multiple access
DCT discrete cosine transform
DSP digital signal processor
FDMA frequency division multiple access
FPGA field-programmable gate array
GSM Global System for Mobile communications
H.222.0 MPEG-2 Systems, standard for the generic coding of moving pictures and associated audio information
H.26x family of video coding standards in the domain of the ITU-T
IBC intra block copy
ID or id identifier
IEC International Electrotechnical Commission
IEEE Institute of Electrical and Electronics Engineers
IMD integrated messaging device
IMS instant messaging service
IoT internet of things
IP internet protocol
ISO International Organization for Standardization
ISOBMFF ISO base media file format
ITU International Telecommunication Union
ITU-T ITU Telecommunication Standardization Sector
MMS multimedia messaging service MPEG moving picture experts group
MPEG-2 H.222/H.262 as defined by the ITU
MSE mean squared error
NAL network abstraction layer
net network
NN neural network
NNR neural network representation(s)
PC personal computer
PDA personal digital assistant
PID packet identifier
PLC power line connection
PSNR peak signal-to-noise ratio
RFID radio frequency identification
SMS short messaging service
SSIM structural similarity index measure
TCP-IP transmission control protocol-internet protocol
TDMA time divisional multiple access
TS transport stream
TV television
UICC universal integrated circuit card
UMTS Universal Mobile Telecommunications System
USB universal serial bus
WLAN wireless local area network A neural network (NN) is a set of algorithms or computation graph consisting of several layers of computation. Each layer consists of one or more units, where each unit performs a computation such as an elementary computation. A unit is connected to one or more other units, and the connection may have an associated weight. The weight may be used for scaling the signal passing through the associated connection. Weights may be learnable parameters, i.e., values which can be learned from training data. There may be other learnable parameters, such as those of batch-normalization layers for example.

Figure 4:
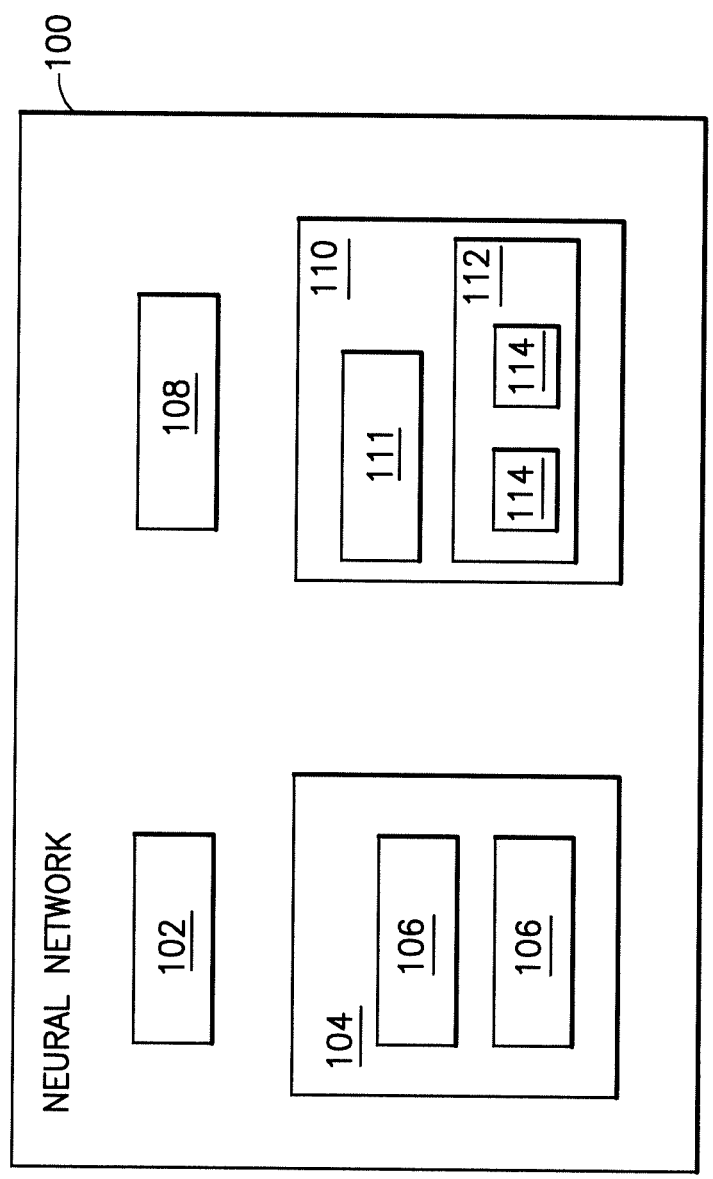
FIG. 4 shows a schematic illustration of an example of a neural network.

A schematic illustration of an example of a neural network 100 is shown in FIG. 4. In this schematic illustration, the neural network 100 comprises multiple elements 102-114. The elements may comprise the units noted above and may be attributed to various different features or components or pieces of the neural network 100, such as aspects or tasks of the neural network. Each element may have one or more layers as illustrated by 106 in 104, and 111, 112, and 114 in 110.

Two of the most widely used architectures for neural networks are feed-forward and recurrent architectures. Feed-forward neural networks are such that there is no feedback loop: each layer takes input from one or more of the layers before and provides its output as the input for one or more of the subsequent layers. Also, units inside a certain layer may take input from units in one or more of preceding layers, and provide output to one or more of following layer(s).

Initial layers (those close to the input data) extract semantically low-level features such as edges and textures in images, and intermediate and final layers extract more high-level features. After the feature extraction layers, there may be one or more layers performing a certain task such as, for example, classification, semantic segmentation, object detection, denoising, style transfer, super-resolution, etc. In recurrent neural nets, there may be a feedback loop, so that the network becomes stateful, i.e., it is able to memorize information or a state.

Neural networks are being utilized in an ever increasing number of applications for many different types of devices, such as mobile phones. Examples include image and video analysis and processing, social media data analysis, device usage data analysis, etc.

A property of neural nets (and other machine learning tools) is that they are able to learn properties from input data; either in a supervised way or in an unsupervised way. Such learning may be a result of a training algorithm, or of a meta-level neural network providing the training signal.

In general, a training algorithm consists of changing some properties of the neural network so that its output is as close as possible to a desired output. For example, in a case of classification of objects in images, the output of a neural network may be used to derive a class or category index which indicates the class or category that the object in the input image belongs to. Training may happen by minimizing or decreasing the output's error, also referred to as the loss. Examples of losses are mean squared error, cross-entropy, etc. In recent deep learning techniques, training is an iterative process where, at each iteration, the algorithm modifies the weights of the neural net to make a gradual improvement of the network's output, i.e., to gradually decrease the loss.

As used herein, the terms "model", "neural network", "neural net" and "network" are used interchangeably, and also the weights of neural networks are sometimes referred to as learnable parameters or simply as parameters.

Training a neural network is an optimization process, but the final goal is different from the typical goal of optimization. In optimization, the only goal is to minimize a functional or function. In machine learning, the goal of the optimization or training process is to make the model learn the properties of the data distribution from a limited training dataset. In other words, the goal is to learn to use a limited training dataset in order to learn to generalize to previously unseen data, i.e., data which was not used for training the model. This is usually referred to as generalization. In practice, data may be split into at least two sets, the training set and the validation set. The training set may be used for training the network, i.e., to modify its learnable parameters in order to minimize the loss. The validation set may be used for checking the performance of the network on data which was not used to minimize the loss, as an indication of the final performance of the model. In particular, the errors on the training set and on the validation set may be monitored during the training process to understand the following things:

If the network is learning at all—in this case, the training set error may decrease, otherwise the model is in the regime of underfitting.

If the network is learning to generalize—in this case, also the validation set error may decrease to not be too much higher than the training set error. If the training set error is low, but the validation set error is much higher than the training set error, or it does not decrease, or it even increases, the model may be in the regime of overfitting. This means that the model has just memorized the training set's properties and performs well only on that set, but performs poorly on a set not used for tuning its parameters.

Neural networks may be used for compressing and de-compressing data such as images. An architecture used for such a task is an auto-encoder, which is a neural network consisting of two parts: a neural encoder and a neural decoder (we refer to these simply as encoder and decoder herein, even though we refer to algorithms which are learned from data instead of being tuned by hand). The encoder may take, as input, an image and may produce a code which requires less bits than an input image. This code may have been obtained by a binarization or quantization process after the encoder. The decoder may take this code and reconstruct the image which was input to the encoder. The encoder and the decoder may be trained to minimize a combination of bitrate and distortion, where the distortion may be a Mean Squared Error (MSE), PSNR, SSIM, or similar metrics. These distortion metrics may be inversely proportional to a human visual perception quality.

Neural network compression may refer to the compression of the neural network's weights; which may be the biggest part, in terms of bits, required to represent the neural network. The other part, i.e., the architecture definition, may be considered as negligible (or as requiring much less bits to be represented), with respect to the weights, especially for big neural networks (i.e., NNs with a lot of layers and weights). The input to the compression system may be assumed to be the original trained network; which was trained using at least a task loss. As used herein, task loss refers to a main loss function that a network needs to minimize in order to be trained to achieve a desired output.

Compressing neural networks may be desired for different reasons such as, for example, for reducing the bitrate required to transmit the network over a communication channel, or for reducing the storage requirements, or for reducing the memory consumption at runtime, or for reducing computational complexity at runtime, etc. The performance of an algorithm which compresses a neural network may be based on the reduction of numbers of bits required to represent the network and on the reduction of task performance. A compression algorithm may reduce the number of bits (here referred to as bitrate) as much as possible, while minimizing the reduction of task performance, where task performance may be the performance on the task for which the network was trained such as, for example, classification accuracy for a classifier or MSE for a network performing regression.

There are several approaches to NN compression. Some of them are based on quantization of weights, some others are based on pruning (removing) small values, some others are based on low-rank decompositions of weight matrices, and some others (which are often the most successful) include a training or retraining step. Regarding the latter, the retraining may be performed for each neural network that needs to be compressed. This may consist of retraining the neural network to be compressed with a different loss with respect to the task loss that the network was original trained with such as, for example, with a combination of at least a task loss and a compression loss. The compression loss may be computed on the weights, for example to enforce pruning or sparsification (i.e., to enforce that many weights have low values) or to enforce easier quantizability (i.e., to enforce that the weights' values are near quantized values). Such retraining may take up to one week with current most powerful hardware acceleration.

Figure 2:
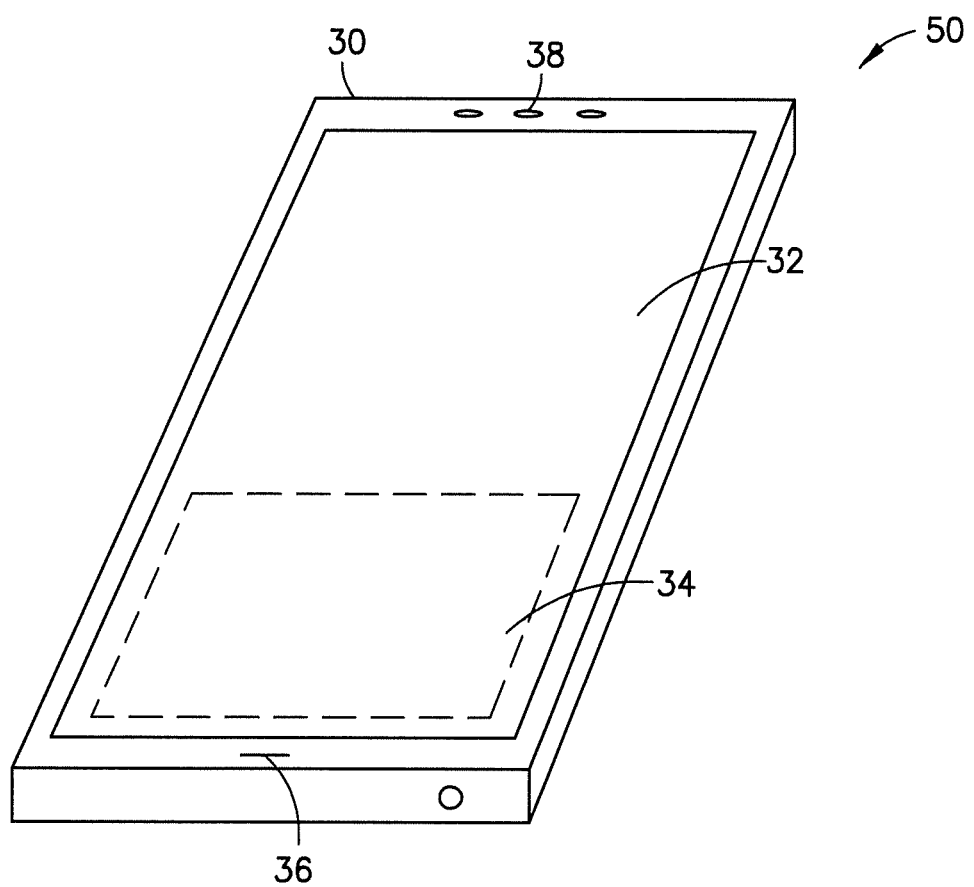
FIG. 2 shows schematically a user equipment suitable for employing embodiments of the examples described herein.

The following describes in further detail suitable apparatuses and possible mechanisms for a video/image encoding process according to example embodiments. In this regard reference is first made to FIGS. 1 and 2, where FIG. 1 shows an example block diagram of an apparatus 50. The apparatus may be an Internet of Things (IoT) apparatus configured to perform various functions, such as for example, gathering information by one or more sensors, receiving or transmitting information, analyzing information gathered or received by the apparatus, or the like. The apparatus 50 may comprise a video coding system, which may incorporate a codec. FIG. 2 shows a layout of the apparatus 50 according to an example embodiment.

The electronic device 50 may, for example, be a mobile terminal or user equipment of a wireless communication system, a sensor device, a tag, or other lower power device. However, it would be appreciated that embodiments may be implemented within any electronic device or apparatus which may process data by neural networks.

The apparatus 50 may comprise a housing 30 for incorporating and protecting the device. The apparatus 50 further may comprise a display 32 in the form of a liquid crystal display for example. In other embodiments the display may be any suitable display technology suitable to display an image or video. The apparatus 50 may further comprise a keypad 34. In other embodiments any suitable data or user interface mechanism may be employed. For example the user interface may be implemented as a virtual keyboard or data entry system as part of a touch-sensitive display.

The apparatus 50 may comprise a microphone 36 or any suitable audio input which may be a digital or analogue signal input. The apparatus 50 may further comprise an audio output device which, for example, may be any one of: an earpiece 38, speaker, or an analogue audio or digital audio output connection. The apparatus 50 may also comprise a battery (or in other embodiments the device may be powered by any suitable mobile energy device such as solar cell, fuel cell or clockwork generator). The apparatus 50 may further comprise a camera 42 capable of recording or capturing images and/or video. The apparatus 50 may further comprise an infrared port for short range line of sight communication to other devices. In other embodiments the apparatus 50 may further comprise any suitable short range communication solution such as, for example, a BLUETOOTH wireless connection or a USB/firewire wired connection.

The apparatus 50 may comprise a controller 56, processor or processor circuitry for controlling the apparatus 50 (e.g. the controller 56 may be a processor). The controller 56 may be connected to memory 58 which may store both data in the form of image and audio data and/or may also store instructions for implementation on the controller 56. The controller 56 may further be connected to codec circuitry 54 suitable for carrying out coding and/or decoding of audio and/or video data or assisting in coding and/or decoding carried out by the controller 56. The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller 56 and suitable for generating wireless communication signals such as, for example, for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera capable of recording or detecting individual frames which are then passed to the codec 54 or the controller 56 for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
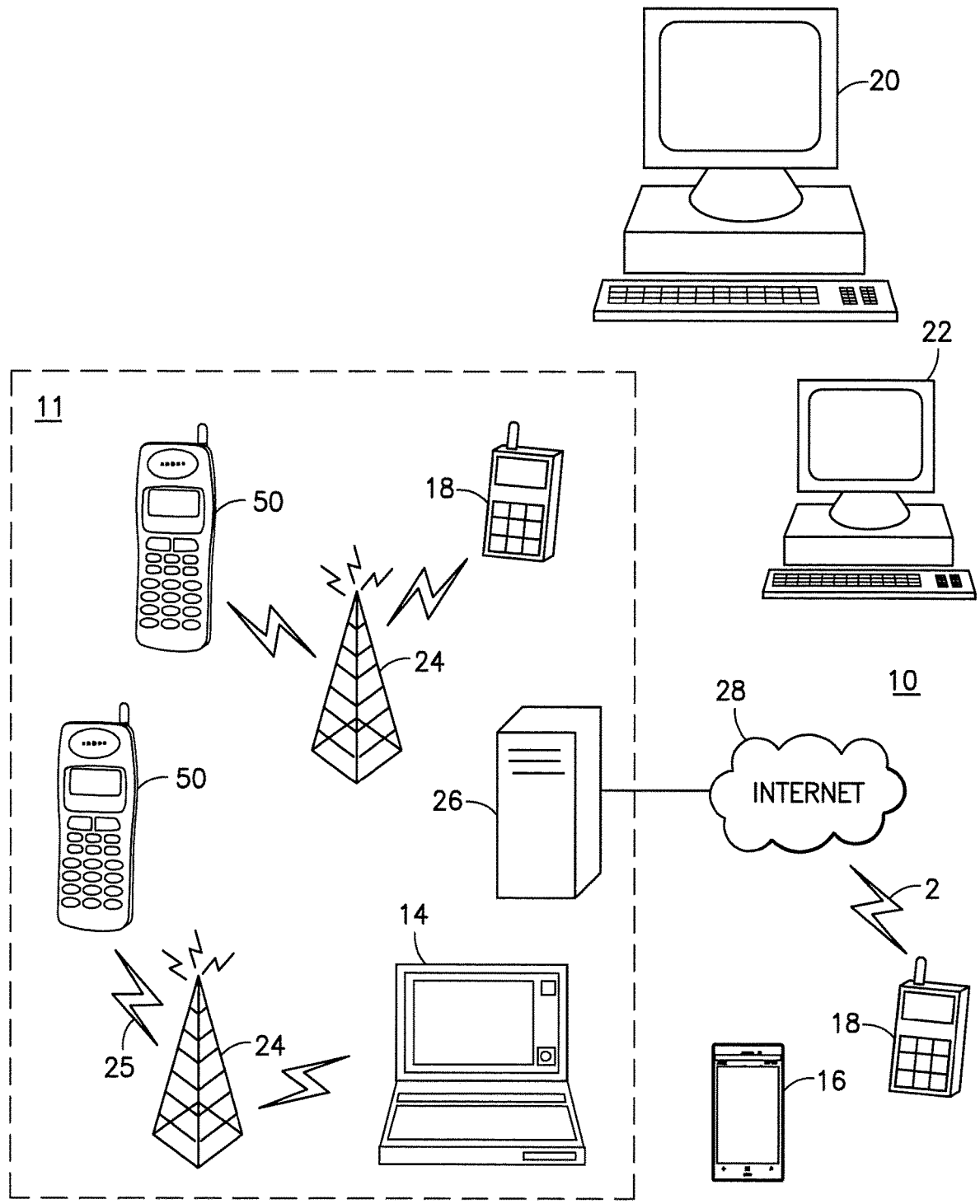
FIG. 3 further shows schematically electronic devices employing embodiments of the examples described herein connected using wireless and wired network connections.

With respect to FIG. 3, an example of a system within which example embodiments may be utilized is shown. The system 10 comprises multiple communication devices which may communicate through one or more networks.

The system 10 may comprise any combination of wired or wireless networks including, but not limited to a wireless cellular telephone network (such as a GSM, UMTS, CDMA, 4G, 5G network etc.), a wireless local area network (WLAN) such as defined by any of the IEEE 802.x standards, a BLUETOOTH personal area network, an Ethernet local area network, a token ring local area network, a wide area network, and the Internet. The system 10 may include both wired and wireless communication devices and/or apparatus 50 suitable for implementing example embodiments. For example, the system shown in FIG. 3 shows a mobile telephone network 11 and a representation of the Internet 28. Connectivity to the Internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, the electronic device or apparatus 50, a combination of a personal digital assistant (PDA) and a mobile telephone 14, a PDA 16, an integrated messaging device (IMD) 18, a desktop computer 20, a notebook computer 22. As shown in FIG. 3, PDA 16, IMD 18, desktop computer 20 and notebook computer 22 may have access to the Internet 28 via wireless or wired link/interface 2. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver (which may or may not have a display or wireless capabilities), in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the Internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), BLUETOOTH, IEEE 802.11, 3GPP Narrowband IoT and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

An example embodiment may also be implemented in a so-called IoT device. The Internet of Things (IoT) may be defined, for example, as an interconnection of uniquely identifiable embedded computing devices within the existing Internet infrastructure. The convergence of various technologies has and will enable many fields of embedded systems, such as wireless sensor networks, control systems, home/building automation, etc. to be included in the Internet of Things (IoT). In order to utilize Internet IoT, devices are provided with an IP address as a unique identifier. IoT devices may be provided with a radio transmitter, such as a WLAN or Bluetooth transmitter or a RFID tag. Alternatively, IoT devices may have access to an IP-based network via a wired network, such as an Ethernet-based network or a power-line connection (PLC).

A MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within a MPEG-2 TS may be considered to correspond to a specific PID value. Available media file format standards include ISO base media file format (ISO/IEC 14496-12, which may be abbreviated ISOBMFF) and file format for NAL unit structured video (ISO/IEC 14496-15), which derives from the ISOBMFF.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically an encoder discards some information in the original video sequence in order to represent the video in a more compact form (that is, at lower bitrate).

Some hybrid video encoders, for example many encoder implementations of ITU-T H.263 and H.264, encode video information in two phases. Firstly, pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly, the prediction error, i.e. the difference between the predicted block of pixels and the original block of pixels, is coded. This is may be done by transforming the difference in pixel values using a specified transform (e.g. Discrete Cosine Transform (DCT) or a variant of it), quantizing the coefficients and entropy coding the quantized coefficients. By varying a fidelity of the quantization process, an encoder can control a balance between the accuracy of the pixel representation (picture quality) and a size of the resulting coded video representation (file size or transmission bitrate).

In temporal prediction, sources of prediction may be previously decoded pictures (a.k.a. reference pictures). In intra block copy (IBC; a.k.a. intra-block-copy prediction and current picture referencing), prediction may be applied similarly to temporal prediction, but the reference picture may be the current picture and only previously decoded samples can be referred in the prediction process. Inter-layer or inter-view prediction may be applied similarly to temporal prediction, but the reference picture may be a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process of temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in the spatial or transform domain, i.e., either sample values or transform coefficients can be predicted. Intra prediction may be exploited in intra coding, where no inter prediction is applied.

One outcome of the coding procedure is a set of coding parameters, such as motion vectors and quantized transform coefficients. Many parameters may be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

With features as described herein, a high-level syntax of neural network representation (NNR) standard signaling information may be included in regard to preferences of the user. The user may be considered to be the entity (person or machine) requesting the compression of a certain neural network. Conventionally, neural network compression is performed by treating the average accuracy as the main guiding metric together with the bitrate minimization. Average accuracy, as used here, generally means the accuracy averaged over different aspects of the neural networks or the task it solves. For example, for a classifier, one aspect is the number of classes, and the accuracy is averaged over all classes. For object localization (or detection), one aspect is the center of the bounding box and another one is the size of the box.

With features as described herein, a user may request the neural network compression by including in the request priority information for a different aspect(s) of the neural network. In one additional or alternative example embodiment, the priority information may be sent from the device performing the neural network compression to the user.

In one example embodiment, it is assumed that a first device (device A) is configured to perform compression of at least one neural network. It is also assumed that a second device (device B), the "user", is a device which needs a compressed neural network for any reason such as, for example, because of limited resources in terms of computational capacity, memory, or power. Device A may be a physical entity such as, for example, a server, or just an abstract entity such as, for example, a part of a bigger device in which also device B resides. The neural network may already be at device A, or neural network may be sent by device B, or device A may get the neural network via a third-party entity. It may also be assumed that it is not possible to get very high compression rates without sacrificing some accuracy in the network. This is a very general assumption and should be valid for most neural networks. Exceptions may be, for example, where the desired output of the neural network can be determined even without analyzing the input (e.g., data with very imbalanced class distribution). The syntax as described below may also be understandable by the two parties.

With features as described herein, a user may send signaling information to device A. This signaling information may be configured for informing what aspects of the neural network may be preserved in terms of accuracy and, optionally, to what extent. "Accuracy" as used herein means any suitable metric measuring the quality of a certain aspect of the neural network. Furthermore, in some cases there may be multiple accuracies which determine the quality of the neural network, and the signaling may consider one or more of these multiple accuracies. Compression will inevitably cause a drop in the accuracy of one or more aspects. With this signalling, during compression by the device A, bits may be saved/reduced more from the aspects that are not important to the user, as identified in the signaling information from the user. Thus, device A is configured to compress the neural network more with respect to aspects which are identified by device B which are not important to the user; and the compression means saving or reducing bits via the compression. Device A is configured to compress the neural network less with respect to aspects which are identified by device B which are important to the user. The signaling information received by device A from the user (device B) may be used to determine aspects in the neural network that are important to the user, which information may then be used by the device A during compression of the neural network to reduce the number of bits removed for those important aspects. This increases accuracy in the compressed neural network for those important aspects identified in the signaling information. With features as described herein, a distinction between what to preserve and what can be "ruined" (not preserved) is not only binary (e.g. not necessarily binary), but can have different categories and even further precision. Alternatively, or additionally, the signaling information may be used to determine one or more aspects in the neural network that are non-important to the user, which information may then be used by the device A during compression of the neural network to increase the number of bits removed for those non-important aspect(s) (reduce accuracy for those aspect(s) of the neural network).

In the case of a classifier, an aspect may be what classes need to be preserved. In the case of an object detection/localization, an aspect may be the center of the bounding box and another is the size of the bounding box. Other examples may be characteristics of semantic segmentation maps, characteristics of generated natural language from an image (e.g., in image captioning), etc. The priority information, for example, may come in one of the following forms (or a combination thereof):

For each aspect, multiple subsets are associated with different priority for each subset. The priority may be a ranking.

For each aspect, multiple subsets are associated with specific allowed degradation ranges.

The following are some non-limiting examples of this signalling, for some use cases.

Example 1

Image Classification into N Classes

The user specifies a subset S1 of classes with priority 1, a subset S2 of classes with priority 2, and a subset S3 of classes with priority 3. The signaling may consist of the following dictionary: {'c1':1, 'c2':3, 'c3':3, 'c4':1, 'c5':2}—where subset S1 comprises classes 'c1' and 'c4', subset S2 comprises class 'c5', and subset S3 comprises classes 'c2' and 'c3'.

Alternatively, the user specifies that for subset S1 it (e.g. the user) can accept no degradation in accuracy, whereas for subsets S2 and S3 it can accept a maximum of 10% degradation in accuracy. Example: {'c1':0, 'c2':10, 'c3':10, 'c4':0, 'c5':10}.

When the server receives the priority information from the user, it (e.g. the server) may compress the neural network with satisfying the priority information. The following is an example for the image classifier:

For the first item noted above, the server (device A) may compress the neural network in a way that the priority 1 classes will be penalized much less than priority 2. Similarly, the server may compress the neural network in a way that the priority 2 classes will be penalized much less than priority 3. This is merely an example and should not be considered as limiting.

For the second item noted above as an alternative, the server (device A) may compress the neural network in a way that classes in subset S1 will have 0 degradation in accuracy, and classes in subsets S2 and S3 will have a maximum 10% degradation in accuracy. Again, this is merely an example and should not be considered as limiting.

Example 2

Object Detector

A user specifies that a center of the bounding box has priority 1, whereas a size of the box has priority 2.

Alternatively, the user specifies that the center may have no degradation margin and the size may have a degradation margin of 10 pixels. Example: {'center':0, 'size':10}.

With features as described herein, features need not be restricted to any specific algorithm used by the server for compressing the neural network.

Features as described herein may be used for signalling priority information to the user. In this additional example embodiment, the server may send information to the user(s) to allow the user(s) to prioritize one or more aspects of the neural network. The prioritization of the one or more aspects may be options by the user. The server may send the information to the user(s) a map between different compression hyper-parameters and resultant priorities. This may be sent in-band or out-of-band (with respect to the compressible model). For example, the server may first process a neural network to make the neural network more compressible (e.g., more robust to sparsification), and then send the neural network to the user(s) with an associated map. This map may associate different sparsification thresholds to different priority rankings. The following is an example:

{0.05:{'c1':1, 'c2':3, 'c3':3, 'c4':1, 'c5':2}, 0.1:{'c1':2, 'c2':3, 'c3':3, 'c4':1, 'c5':2}}.

The user may then select a sparsification threshold based on which classes the user considers more important. For example, if class 'c1' is very important for that user, 0.05 may be used to threshold and, thus, sparsify the weights.

This example embodiment may be useful when a size of the neural network, which is input to the user's device, is not a concern (e.g., when the channel bandwidth or the memory are not a concern), and instead a main concern is the inference-stage resources such as, for example, memory, computational capabilities, and power at inference time, which may even change and, thus, be dynamic (e.g., due to many processes running on the user's device, resource availability may change in time). In these cases, the user may decide how much it wants to compress (or further compress) the neural network. The input neural network may be a more compressible version of the received neural network such as, for example, trained or fine-tuned using a compression loss on the weights which makes them more robust to compression, and/or already compressed to a certain extent (so that it can be further compressed by the user).

Figure 12:
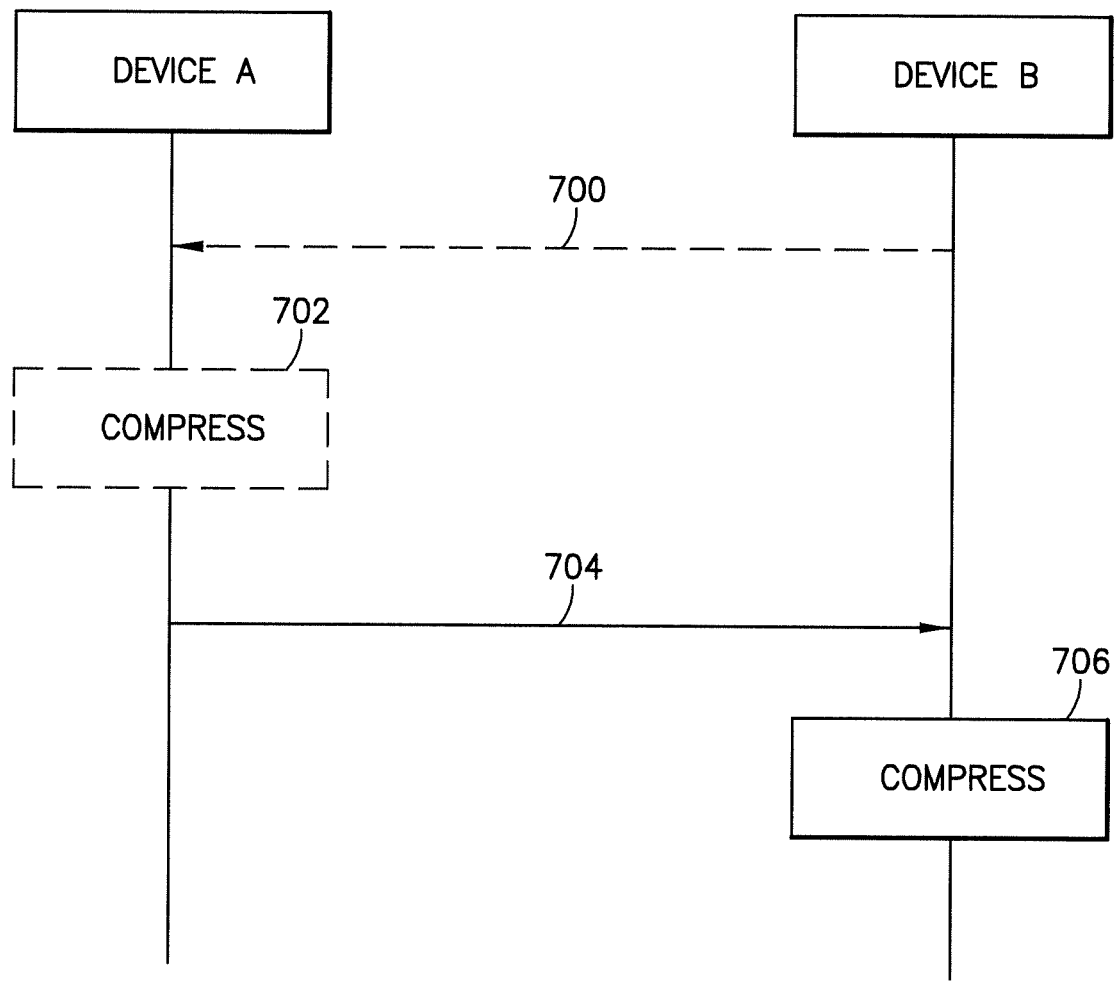
FIG. 12 is another signaling diagram for compressing a neural network based on the example methods described herein.

This embodiment (signalling priority information to the user) is shown by the signaling diagram of FIG. 12. In FIG. 12, at 704 device A (e.g. an encoder) sends/signals a neural network and the priority information to device B (e.g. a decoder). In some examples device A sends/signals priority information without sending a neural network. The priority information signalled at 704, as mentioned, may be a map between different compression hyper-parameters and resultant priorities, and/or the priority information signalled at 704 may be a map that associates different sparsification thresholds to different priority rankings, or information related to unification or decomposition. The signalled information at 704 may also be information similar to the signaling information provided as in the other embodiments, for example similar to the signaling information provided at 200 in FIG. 5 or the signaling information provided at 200' in FIG. 8 and as described throughout herein. At 706, device B compresses or further compresses the neural network, acting as an encoder, based on the received signaling information provided at 704. Device B further compresses the neural network in the sense that device A compressing the neural network at 702 is optional, wherein the compressing at 702 is done e.g. prior to sending the neural network and/or the signaling information at 704 to device B. The compression at 702 is optional as indicated by the dashed line. Also optional at 700 (optionality indicated by the dashed line), is device B requesting the neural network and/or the signaling information from device A.

Figure 5:
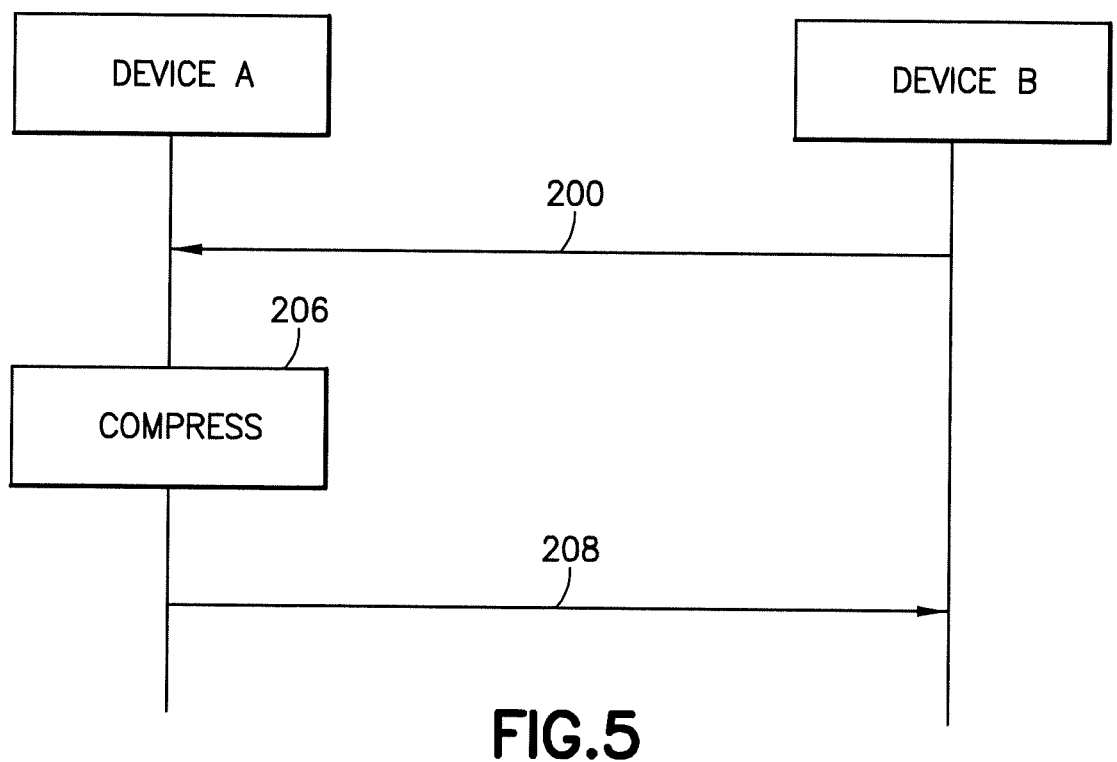
FIG. 5 is a signaling diagram for compressing a neural network based on the example methods described herein.

It should be noted that FIG. 12 illustrates the embodiment of signaling priority information to the user (e.g. device B) from an encoder or the network (e.g. device A), however this embodiment is already reflected in the other figures such as FIG. 5. For example, in FIG. 5 device B, rather than being the user device can be a server or encoder, and at 200 device B sends signaling information and/or a neural network (initially compressed or not) to device A, where device A is the user device or decoder rather than the serving device or encoder. Then at 206, device A compresses or further compresses the neural network acting as an encoder. At 208 within FIG. 5, device A may send an acknowledgement that the information at 200 was received, or even the compressed or further compressed neural network to device B.

Figure 8:
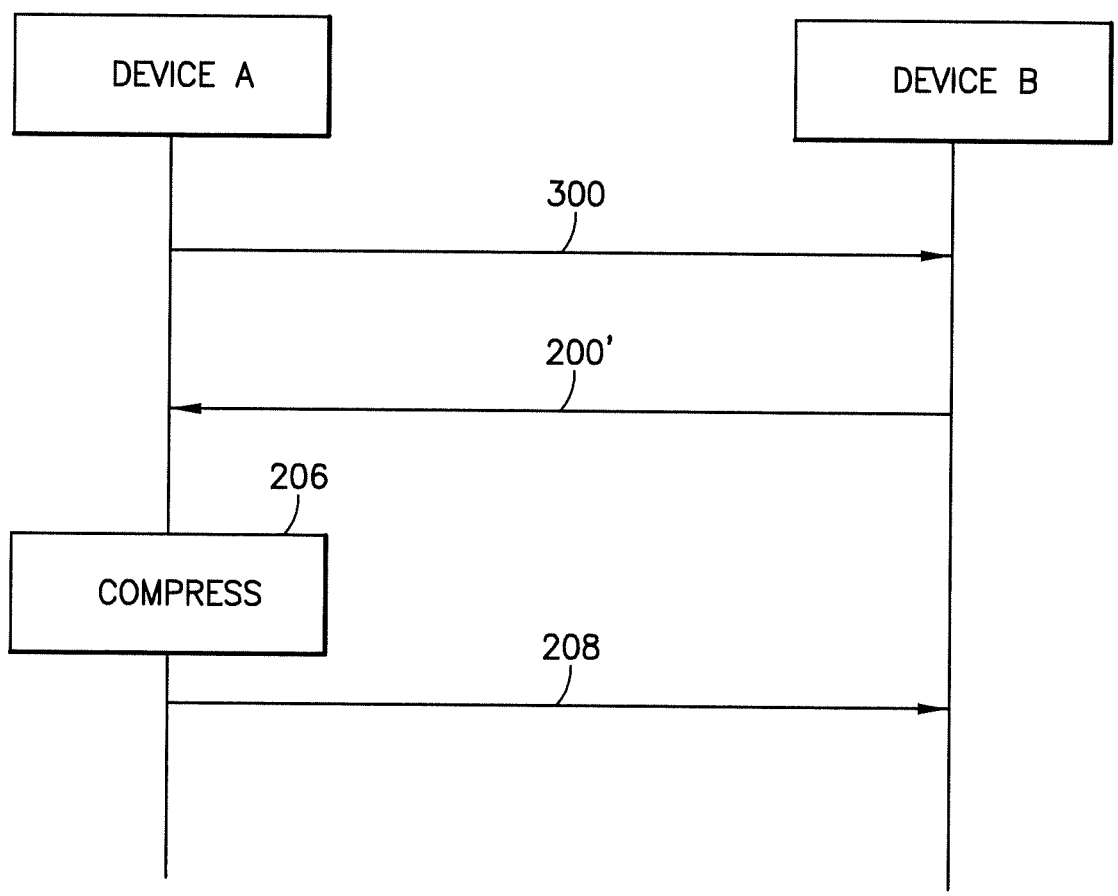
FIG. 8 is another signaling diagram for compressing a neural network based on the example methods described herein.

Similarly in FIG. 8, device B can be the serving device or encoder, rather than the user device, where device B sends a neural network (initially compressed or not) and/or priority/signaling information at 200' to device A, where device A is a user device or decoder. In FIG. 8, at 206 the user device or decoder compresses or further compresses the neural network acting also as an encoder. At 300 within FIG. 8, the user device or decoder device A sends a request for the signaling information to device B e.g. prior to device B sending to device A the signaling information at 200'. At 208 within FIG. 8, device A may send an acknowledgement that the information at 200' was received, or even the compressed or further compressed neural network to device B.

Figure 13:
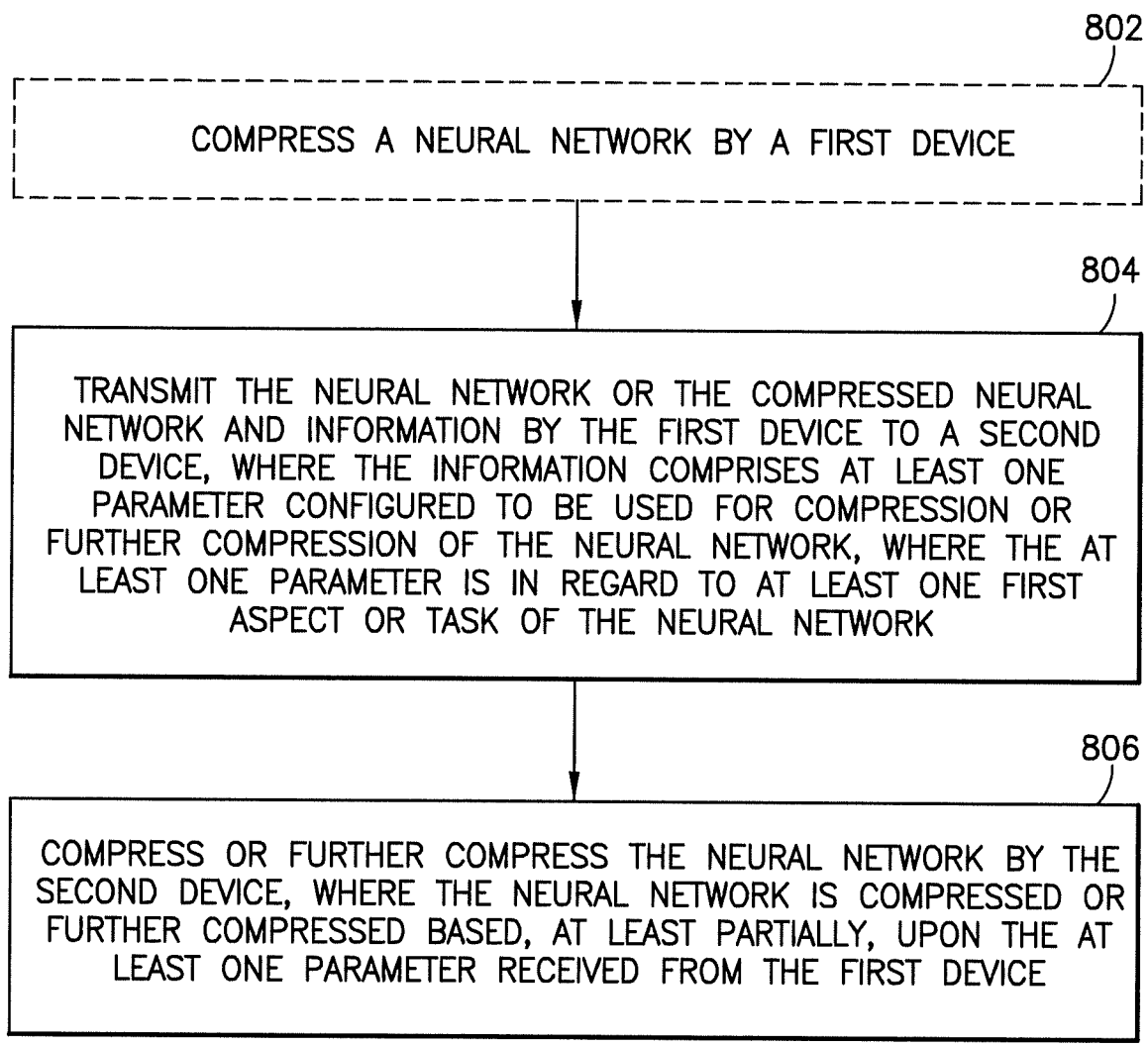
FIG. 13 is another example method for compressing a neural network.

FIG. 13 is another example method for compressing a neural network that is based on the signaling diagram shown in FIG. 12. The method optionally includes at 802 compressing a neural network by a first device. The first device may be for example an encoder. At 804, the method includes transmitting the neural network (e.g. uncompressed) or the compressed neural network and information by the first device to a second device, where the information comprises at least one parameter configured to be used for compression or further compression of the neural network, where the at least one parameter is in regard to at least one first aspect or task of the neural network. The second device may be for example a decoder. At 806, the method includes compressing or further compressing the neural network by the second device, where the neural network is compressed or further compressed based, at least partially, upon the at least one parameter received from the first device.

In Moving Picture Experts Group (MPEG) neural network representation (NNR), there is a need for a high-level syntax. One of the aspects that the high-level syntax may support is preferences from the user (who requests the compression) about some aspects of the neural network (NN) or some aspects of the task that the neural network (NN) solves.

Figure 6:
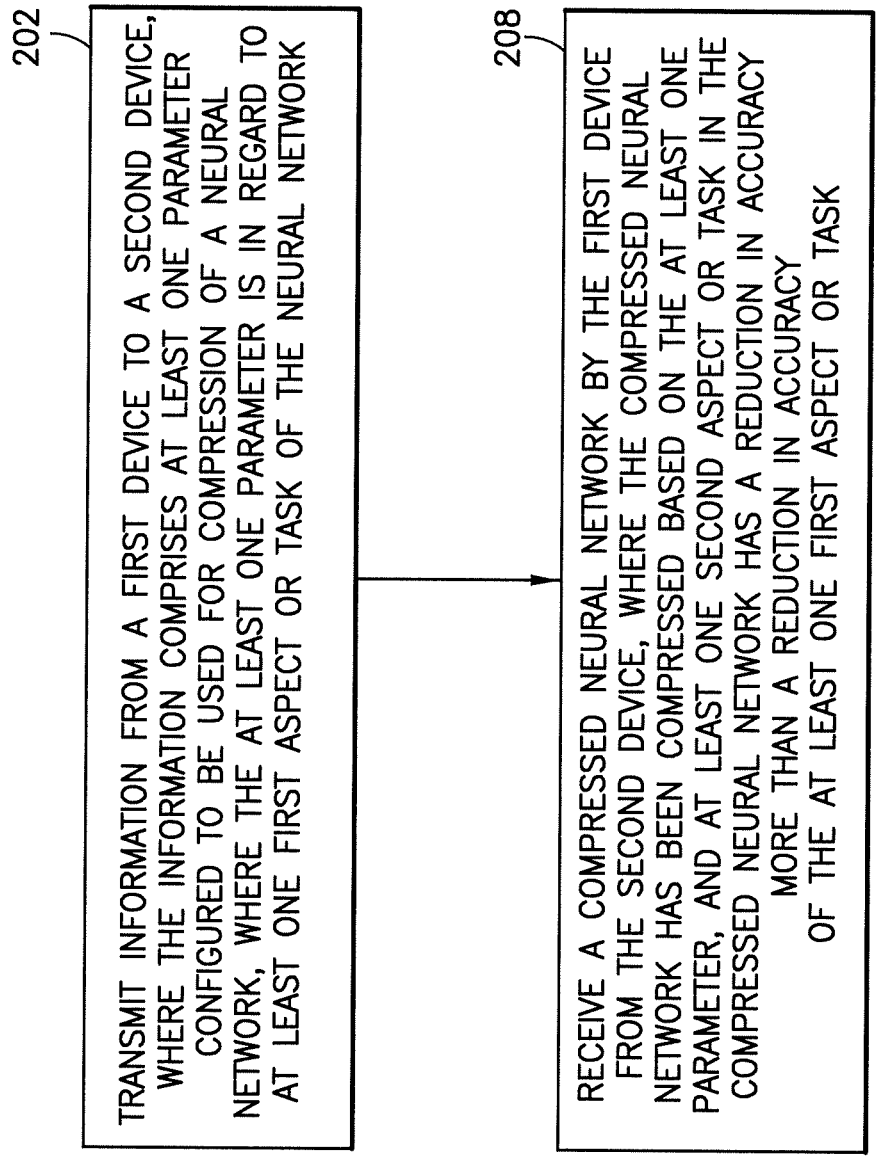
FIG. 6 is an example method for compressing a neural network.
Figure 7:
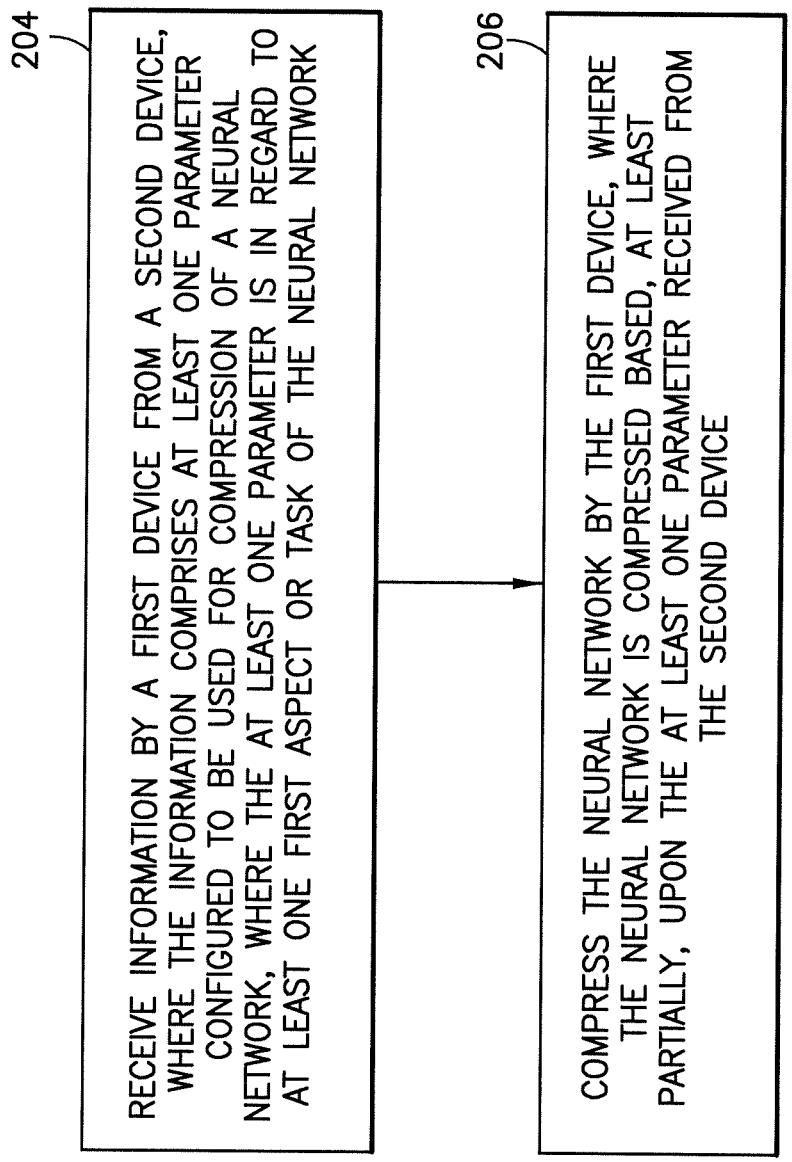
FIG. 7 is another example method for compressing a neural network.

Referring also to FIGS. 5-7 one example method will be further described. In this example, device A is configured to compress a neural network. Device B may send a request to device A for the neural network as indicated by 200 in FIG. 5. As indicated by 202 in FIG. 6, the request may comprise signaling information from a device B to a device A, where the information comprises at least one parameter configured to be used for compression of the neural network where the at least one parameter identifies a first aspect or task of the neural network, such as 108 in FIG. 4 for example. As used herein, a "task" of a neural net may sometimes merely be referred to as an "aspect" of the neural net. As indicated by 204 in FIG. 7 and by 200 in FIG. 5, device A can receive the signaling information from device B which comprises the at least one parameter configured to be used for compression of the neural network. As indicated by 206 in FIG. 7 and 206 in FIG. 5, device A may then compress the neural network, where the first aspect of the neural network has less loss during the compression (versus at least one other aspect of the neural network) based, at least partially, upon the at least one parameter received from device B. As indicated by 208 in FIGS. 5 and 6, device A may then transmit and device B receive the compressed neural network, where the compressed neural network comprises the first aspect or task, such as 104 in FIG. 4 for example, having less loss based on the at least one parameter, and at least one second aspect or task, such as 110 in FIG. 4 for example, which has more loss than the first aspect 108.

Figure 9:
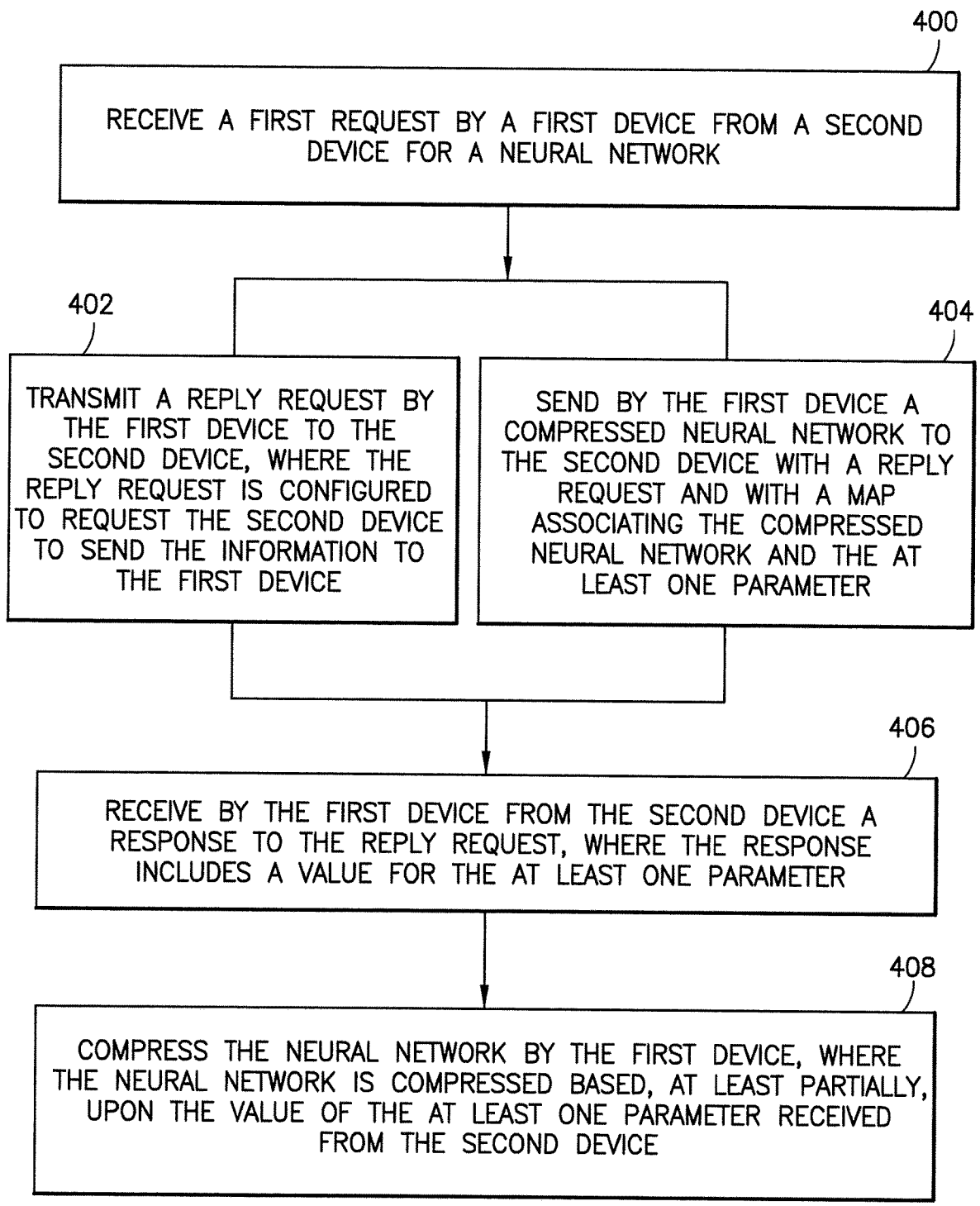
FIG. 9 shows two example methods for compressing a neural network.

Referring also to FIG. 8, another example is shown where, prior to device B sending the signalling information, device A sends a request 300 to device B to send the signalling information. Device B may then send a reply request 200' to device A with the signalling information. Referring also to FIG. 9, two example methods are shown where a first request for a neural network by a device B is transmitted and received by device A as indicated by block 400. In one example method, as illustrated by block 402, device A transmits to device B a reply request, where the reply request is configured to request device B to send the information to the first device e.g. device A. In another example method, as illustrated by block 404, device A sends a compressed neural network to device B with a reply request and with a map associating the compressed neural network and the at least one parameter. As illustrated by block 406, device B transmits and device A receives a response to the reply request, where the response includes a value for the at least one parameter. As illustrated by block 408, device A may then compress 206 the neural network, where the first aspect of the neural network has less loss than at least one other aspect of the neural network based, at least partially, upon the value of the at least one parameter received from device B e.g. the second device.

Figure 10:
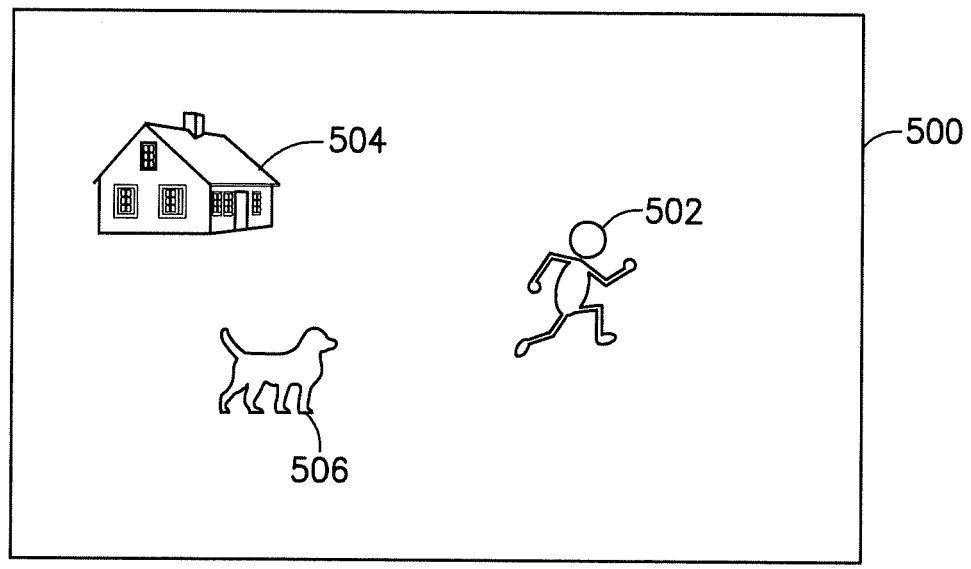
FIG. 10 shows an image with portions that may be identified by a neural network.
Figure 11:
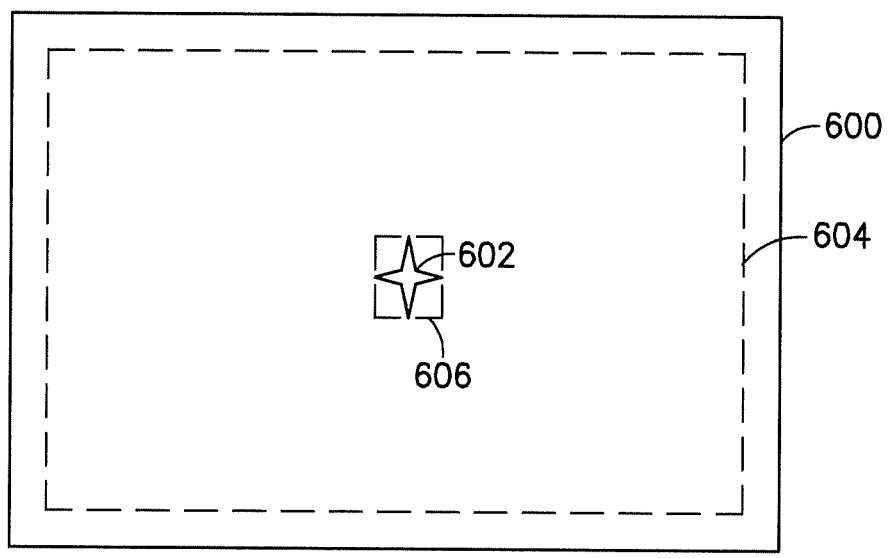
FIG. 11 shows an image where a center of the image or bounding box is identified and a bounding box is identified by e.g. a neural network.

As noted above, features as described herein may be used in regard to images. FIG. 10, for example, shows an image 500 with portions 502, 504, 506. The neural network may be configured to identify the different types of portions, such as person 502, house 504 and dog 506. Some portions, such as live subjects 502 and 506, may be grouped together as a subset in some aspects of the neural network. 502 and 506 may be given a first classification, 504 may be given a second different classification, and each may be given a different priority regarding loss when the neural network is compressed. Device B may be able to specify to device A that aspects or tasks of the neural network relating to an item in the image, such as relating to the person 502, should have no loss or should have a loss no less than a predetermined value or degradation. Referring also to FIG. 11, an image 600 is shown where a center 602 of the image is identified and a bounding box 604 or 606 is identified. The signalling information sent by device B to device A may include a value for a parameter regarding the center 602 and/or bounding box 604 and/or bounding box 606. For example, the signalling information may specify that an area around the center 602 may be degraded only to a limit of 20 percent, but that the area around the bounding box 604 or 606 may be degraded up to a limit of 50 percent. These are merely examples to help understand features as described herein, and should not be considered as limiting.

The compression is applied to the neural network, not to a specific aspect of the neural network. An aspect or task of a neural network is, for example, the size of the bounding box 604 or 606 (such as in a case of an object detection neural network for example). With features as described herein, compressing of the neural network may be accomplished so that the size of the bounding box 604 or 606 has more drop in accuracy with respect to the center 602 of the image or bounding box, where the drop in accuracy at 604 or 606 and 602 is caused by compression of the neural network.

Figure 14:
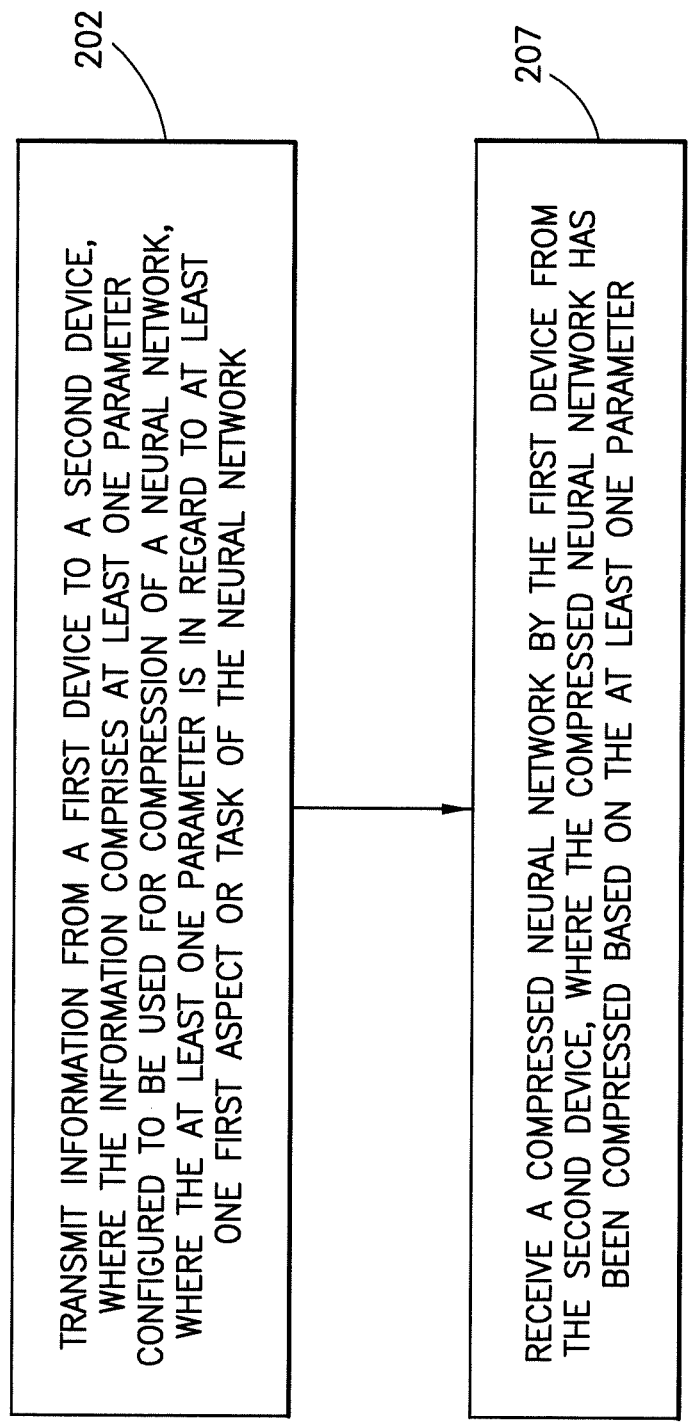
FIG. 14 is another example method for compressing a neural network.

FIG. 14 is another example method for compressing a neural network, based on the examples described herein. At 202, the method includes transmitting information from a first device to a second device, where the information comprises at least one parameter configured to be used for compression of a neural network, where the at least one parameter is in regard to at least one first aspect or task of the neural network. At 207, the method includes receiving a compressed neural network by the first device from the second device, where the compressed neural network has been compressed based on the at least one parameter.

References to a 'computer', 'processor', and in some examples 'controller', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, etc.

The memory 58 may be implemented using any suitable data storage technology, such as semiconductor based memory devices, flash memory, magnetic memory devices and systems, optical memory devices and systems, fixed memory and removable memory. The memory 58 may comprise a database for storing data.

As used herein, the term 'circuitry' refers to all of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An example method may be provided comprising: receiving information by a first device from a second device, where the information comprises at least one parameter configured to be used for compression of a neural network, where the at least one parameter is in regard to at least one first aspect or task of the neural network; and compressing the neural network by the first device, where the neural network is compressed based, at least partially, upon the at least one parameter received from the second device.

Other aspects of the method may include the following. The at least one first aspect or task may comprise an individual aspect or task of the neural network. The compressing of the neural network may result in accuracy of at least one second aspect or task of the neural network being less than accuracy of the at least one first aspect or task. The information may comprise identification of the at least one first aspect or task. The information may comprise identification of an image classification. The at least one parameter may comprise a priority value. The information may comprise identification of at least one portion of an image. The at least one parameter may comprise information to prevent any accuracy reduction of the at least one first aspect or task. The information may comprise identification of multiple subsets of classes, and where the at least one first aspect or task may comprise one of the multiple subsets. The at least one parameter may comprise a percent or value less than one. The at least one parameter may comprise a compression value or setting in relation to the at least one first aspect or task. The information may comprise an image location on an image, and the at least one parameter may comprise a compression setting for the image location. The image location may comprise at least one of a center (e.g. a center of an image or a center of a bounding box) or a bounding box. The at least one parameter may comprise a pixel value. The at least one parameter may comprise a degradation value or degradation range. The method may further comprise transmitting the compressed neural network compressed by the first device to the second device. The method may further comprise transmitting a request by the first device to the second device, where the request is configured to request the second device to send the information to the first device. The request may identify multiple priorities for the at least one parameter. The request may identify different aspects or tasks of the neural network including the at least one first aspect or task. The request may comprise a map. The first device may send a compressed neural network to the second device with the request and with a map associating the compressed neural network and the at least one parameter.

Other aspects of the method may include the following. The method may further include receiving by the first device the neural network from the second device. The neural network received by the first device may be a compressed neural network. The received compressed neural network may have been compressed with the second device prior to compression of the neural network by the first device. The information may comprise a sparsification performance map that specifies a mapping between at least one sparsification threshold and at least one accuracy of the neural network. The at least one accuracy may be provided separately for different aspects, including the at least one first aspect or task of the neural network, of an output of the neural network. Each of the at least one sparsification threshold may be mapped to a separate of the at least one accuracy for each of at least one class. Each of the at least one sparsification threshold may be mapped to an overall accuracy that considers each of the at least one class. Each of the at least one class predicted with the neural network may be ordered based on an output order of the neural network, or an order specified during training of the neural network. The information may comprise a unification performance map that specifies a mapping between at least one unification threshold and at least one accuracy of the neural network. The at least one accuracy may be provided separately for different aspects, including the at least one first aspect or task of the neural network, of an output of the neural network. Each of the at least one unification threshold may be mapped to a separate of the at least one accuracy for each of at least one class. Each of the at least one unification threshold may be mapped to an overall accuracy that considers each of the at least one class. Each of the at least one class predicted with the neural network may be ordered based on an output order of the neural network, or an order specified during training of the neural network. The information may comprise a decomposition performance map that specifies a mapping between at least one MSE threshold between at least one decompressed tensor and at least one original tensor and at least one accuracy of the neural network. The at least one accuracy may be provided separately for different aspects, including the at least one first aspect or task of the neural network, of an output of the neural network. Each of the at least one MSE threshold may be mapped to a separate of the at least one accuracy for each of at least one class. Each of the at least one MSE threshold may be mapped to an overall accuracy that considers each of the at least one class. Each of the at least one class predicted with the neural network may be ordered based on an output order of the neural network, or an order specified during training of the neural network. The first device may be an encoder, and the second device may be a decoder. The first device may be a decoder, and the second device may be an encoder.

An example embodiment may be provided in an apparatus comprising: at least one processor; and at least one non-transitory memory including computer program code, the at least one memory and the computer program code configured to, with the at least one processor, cause the apparatus to: cause receiving of information from a second device, where the information comprises at least one parameter configured to be used for compression of a neural network, where the at least one parameter is in regard to at least one first aspect or task of the neural network; and compressing the neural network, where the neural network is compressed based, at least partially, upon the at least one parameter received from the second device.

Other aspects of the apparatus may include the following. The at least one first aspect or task may comprise an individual aspect or task of the neural network. The compressing of the neural network may result in accuracy of at least one second aspect or task of the neural network being less than accuracy of the at least one first aspect or task. The information may comprise identification of the at least one first aspect or task. The information may comprise identification of an image classification. The at least one parameter may comprise a priority value. The information may comprise identification of at least one portion of an image. The at least one parameter may comprise information to prevent any accuracy reduction of the at least one first aspect or task. The information may comprise identification of multiple subsets of classes, and where the at least one first aspect or task may comprise one of the multiple subsets. The at least one parameter may comprise a percent or value less than one. The at least one parameter may comprise a compression value or setting in relation to the at least one first aspect or task. The information may comprise an image location on an image, and the at least one parameter may comprise a compression setting for the image location. The image location may comprise at least one of a center (e.g. a center of an image or a center of a bounding box) or a bounding box. The at least one parameter may comprise a pixel value. The at least one parameter may comprise a degradation value or degradation range. The at least one memory and the computer program code may be further configured to, with the at least one processor, cause the apparatus to transmit the compressed neural network to the second device. The at least one memory and the computer program code may be further configured to, with the at least one processor, cause the apparatus to transmit a request to the second device, where the request is configured to request the second device to send the information to the apparatus. The request may identify multiple priorities for the at least one parameter. The request may identify different aspects or tasks of the neural network including the at least one first aspect or task. The request may comprise a map. The apparatus may send a compressed neural network to the second device with the request and with a map associating the compressed neural network and the at least one parameter.

Other aspects of the apparatus may include the following. The at least one memory and the computer program code may be further configured to, with the at least one processor, cause the apparatus to receive the neural network from the second device. The neural network received may be a compressed neural network. The received compressed neural network may have been compressed with the second device prior to compression of the neural network. The information may comprise a sparsification performance map that specifies a mapping between at least one sparsification threshold and at least one accuracy of the neural network. The at least one accuracy may be provided separately for different aspects, including the at least one first aspect or task of the neural network, of an output of the neural network. Each of the at least one sparsification threshold may be mapped to a separate of the at least one accuracy for each of at least one class. Each of the at least one sparsification threshold may be mapped to an overall accuracy that considers each of the at least one class. Each of the at least one class predicted with the neural network may be ordered based on an output order of the neural network, or an order specified during training of the neural network. The information may comprise a unification performance map that specifies a mapping between at least one unification threshold and at least one accuracy of the neural network. The at least one accuracy may be provided separately for different aspects, including the at least one first aspect or task of the neural network, of an output of the neural network. Each of the at least one unification threshold may be mapped to a separate of the at least one accuracy for each of at least one class. Each of the at least one unification threshold may be mapped to an overall accuracy that considers each of the at least one class. Each of the at least one class predicted with the neural network may be ordered based on an output order of the neural network, or an order specified during training of the neural network. The information may comprise a decomposition performance map that specifies a mapping between at least one MSE threshold between at least one decompressed tensor and at least one original tensor and at least one accuracy of the neural network. The at least one accuracy may be provided separately for different aspects, including the at least one first aspect or task of the neural network, of an output of the neural network. Each of the at least one MSE threshold may be mapped to a separate of the at least one accuracy for each of at least one class. Each of the at least one MSE threshold may be mapped to an overall accuracy that considers each of the at least one class. Each of the at least one class predicted with the neural network may be ordered based on an output order of the neural network, or an order specified during training of the neural network. The apparatus may be an encoder, and the second device may be a decoder. The apparatus may be a decoder, and the second device may be an encoder.

An example embodiment may be provided with a non-transitory program storage device readable by a machine, tangibly embodying a program of instructions executable by the machine for performing operations, the operations comprising: receiving information by a first device from a second device, where the information comprises at least one parameter configured to be used for compression of a neural network, where the at least one parameter is in regard to at least one first aspect or task of the neural network; and compressing the neural network by the first device, where the neural network is compressed based, at least partially, upon the at least one parameter received from the second device.

Other aspects of the non-transitory program storage device may include the following. The at least one first aspect or task may comprise an individual aspect or task of the neural network. The compressing of the neural network may result in accuracy of at least one second aspect or task of the neural network being less than accuracy of the at least one first aspect or task. The information may comprise identification of the at least one first aspect or task. The information may comprise identification of an image classification. The at least one parameter may comprise a priority value. The information may comprise identification of at least one portion of an image. The at least one parameter may comprise information to prevent any accuracy reduction of the at least one first aspect or task. The information may comprise identification of multiple subsets of classes, and where the at least one first aspect or task may comprise one of the multiple subsets. The at least one parameter may comprise a percent or value less than one. The at least one parameter may comprise a compression value or setting in relation to the at least one first aspect or task. The information may comprise an image location on an image, and the at least one parameter may comprise a compression setting for the image location. The image location may comprise at least one of a center (e.g. a center of an image or a center of a bounding box) or a bounding box. The at least one parameter may comprise a pixel value. The at least one parameter may comprise a degradation value or degradation range. The operations may further comprise transmitting the compressed neural network compressed by the first device to the second device. The operations may further comprise transmitting a request by the first device to the second device, where the request is configured to request the second device to send the information to the first device. The request may identify multiple priorities for the at least one parameter. The request may identify different aspects or tasks of the neural network including the at least one first aspect or task. The request may comprise a map. The first device may send a compressed neural network to the second device with the request and with a map associating the compressed neural network and the at least one parameter.

Other aspects of the non-transitory program storage device may include the following. The operations may further include receiving by the first device the neural network from the second device. The neural network received by the first device may be a compressed neural network. The received compressed neural network may have been compressed with the second device prior to compression of the neural network by the first device. The information may comprise a sparsification performance map that specifies a mapping between at least one sparsification threshold and at least one accuracy of the neural network. The at least one accuracy may be provided separately for different aspects, including the at least one first aspect or task of the neural network, of an output of the neural network. Each of the at least one sparsification threshold may be mapped to a separate of the at least one accuracy for each of at least one class. Each of the at least one sparsification threshold may be mapped to an overall accuracy that considers each of the at least one class. Each of the at least one class predicted with the neural network may be ordered based on an output order of the neural network, or an order specified during training of the neural network. The information may comprise a unification performance map that specifies a mapping between at least one unification threshold and at least one accuracy of the neural network. The at least one accuracy may be provided separately for different aspects, including the at least one first aspect or task of the neural network, of an output of the neural network. Each of the at least one unification threshold may be mapped to a separate of the at least one accuracy for each of at least one class. Each of the at least one unification threshold may be mapped to an overall accuracy that considers each of the at least one class. Each of the at least one class predicted with the neural network may be ordered based on an output order of the neural network, or an order specified during training of the neural network. The information may comprise a decomposition performance map that specifies a mapping between at least one MSE threshold between at least one decompressed tensor and at least one original tensor and at least one accuracy of the neural network. The at least one accuracy may be provided separately for different aspects, including the at least one first aspect or task of the neural network, of an output of the neural network. Each of the at least one MSE threshold may be mapped to a separate of the at least one accuracy for each of at least one class. Each of the at least one MSE threshold may be mapped to an overall accuracy that considers each of the at least one class. Each of the at least one class predicted with the neural network may be ordered based on an output order of the neural network, or an order specified during training of the neural network. The first device may be an encoder, and the second device may be a decoder. The first device may be a decoder, and the second device may be an encoder.

An example embodiment may be provided with an apparatus comprising: means for receiving information from a second device, where the information comprises at least one parameter configured to be used for compression of a neural network, where the at least one parameter is in regard to at least one first aspect or task of the neural network; and means for compressing the neural network, where the neural network is compressed based, at least partially, upon the at least one parameter received from the second device.

Other aspects of the apparatus may include the following. The at least one first aspect or task may comprise an individual aspect or task of the neural network. The compressing of the neural network may result in accuracy of at least one second aspect or task of the neural network being less than accuracy of the at least one first aspect or task. The information may comprise identification of the at least one first aspect or task. The information may comprise identification of an image classification. The at least one parameter may comprise a priority value. The information may comprise identification of at least one portion of an image. The at least one parameter may comprise information to prevent any accuracy reduction of the at least one first aspect or task. The information may comprise identification of multiple subsets of classes, and where the at least one first aspect or task may comprise one of the multiple subsets. The at least one parameter may comprise a percent or value less than one. The at least one parameter may comprise a compression value or setting in relation to the at least one first aspect or task. The information may comprise an image location on an image, and the at least one parameter may comprise a compression setting for the image location. The image location may comprise at least one of a center (e.g. a center of an image or a center of a bounding box) or a bounding box. The at least one parameter may comprise a pixel value. The at least one parameter may comprise a degradation value or degradation range. The apparatus may further include means for transmitting the compressed neural network to the second device. The apparatus may further include means for transmitting a request to the second device, where the request is configured to request the second device to send the information to the apparatus. The request may identify multiple priorities for the at least one parameter. The request may identify different aspects or tasks of the neural network including the at least one first aspect or task. The request may comprise a map. The apparatus may send a compressed neural network to the second device with the request and with a map associating the compressed neural network and the at least one parameter.

Other aspects of the apparatus may include the following. The apparatus may further include means for receiving the neural network from the second device. The neural network received may be a compressed neural network. The received compressed neural network may have been compressed with the second device prior to compression of the neural network. The information may comprise a sparsification performance map that specifies a mapping between at least one sparsification threshold and at least one accuracy of the neural network. The at least one accuracy may be provided separately for different aspects, including the at least one first aspect or task of the neural network, of an output of the neural network. Each of the at least one sparsification threshold may be mapped to a separate of the at least one accuracy for each of at least one class. Each of the at least one sparsification threshold may be mapped to an overall accuracy that considers each of the at least one class. Each of the at least one class predicted with the neural network may be ordered based on an output order of the neural network, or an order specified during training of the neural network. The information may comprise a unification performance map that specifies a mapping between at least one unification threshold and at least one accuracy of the neural network. The at least one accuracy may be provided separately for different aspects, including the at least one first aspect or task of the neural network, of an output of the neural network. Each of the at least one unification threshold may be mapped to a separate of the at least one accuracy for each of at least one class. Each of the at least one unification threshold may be mapped to an overall accuracy that considers each of the at least one class. Each of the at least one class predicted with the neural network may be ordered based on an output order of the neural network, or an order specified during training of the neural network. The information may comprise a decomposition performance map that specifies a mapping between at least one MSE threshold between at least one decompressed tensor and at least one original tensor and at least one accuracy of the neural network. The at least one accuracy may be provided separately for different aspects, including the at least one first aspect or task of the neural network, of an output of the neural network. Each of the at least one MSE threshold may be mapped to a separate of the at least one accuracy for each of at least one class. Each of the at least one MSE threshold may be mapped to an overall accuracy that considers each of the at least one class. Each of the at least one class predicted with the neural network may be ordered based on an output order of the neural network, or an order specified during training of the neural network. The apparatus may be an encoder, and the second device may be a decoder. The apparatus may be a decoder, and the second device may be an encoder.

An example method may be provided comprising: transmitting information from a first device to a second device, where the information comprises at least one parameter configured to be used for compression of a neural network, where the at least one parameter is in regard to at least one first aspect or task of the neural network; and receiving a compressed neural network by the first device from the second device, where the compressed neural network has been compressed based on the at least one parameter.

The method may further comprise using the compressed neural network by the first device in regard to an image. The at least one first aspect or task may comprise an individual aspect or task of the neural network. The information may comprise identification of the at least one first aspect or task. The information may comprise identification of an image classification. The at least one parameter may comprise a priority value. The information may comprise identification of at least one portion of an image. The at least one parameter may comprise information to prevent the reduction in accuracy of the at least one first aspect or task. The information may comprise identification of multiple subsets of classes, and where the at least one first aspect or task may comprise one of the multiple subsets. The at least one parameter may comprise a percent or value less than one. The at least one parameter may comprise a compression value or setting. The information may comprise an image location on an image, and the at least one parameter may comprise a compression setting for the image location. The image location may comprise at least one of a center (e.g. a center of an image or a center of a bounding box) or a bounding box. The at least one parameter may comprise a pixel value. The at least one parameter may comprise a degradation value or degradation range. The method may further comprise receiving a request by the first device from the second device, where the request is configured to request the first device to send the information to the second device. The request may identify multiple priorities for the at least one parameter. The request may identify different aspects or tasks of the neural network including the at least one first aspect or task. The request may comprise a map. The second device may send a first different compressed neural network to the first device with the request and with a map associating the first different compressed neural network and the at least one parameter. The method may further include where at least one second aspect or task in the compressed neural network has a reduction in accuracy more than a reduction in accuracy of the at least one first aspect or task.

An example embodiment may be provided with an apparatus comprising: at least one processor; and at least one non-transitory memory including computer program code, the at least one memory and the computer program code configured to, with the at least one processor, cause the apparatus to: cause transmitting of information from the apparatus to a second device, where the information comprises at least one parameter configured to be used for compression of a neural network, where the at least one parameter is in regard to at least one first aspect or task of the neural network; cause receiving of a compressed neural network from the second device, where the compressed neural network has been compressed based on the at least one parameter.

The at least one memory and the computer program code may be further configured to, with the at least one processor, cause the apparatus to use the compressed neural network in regard to an image. The at least one first aspect or task may comprise an individual aspect or task of the neural network. The information may comprise identification of the at least one first aspect or task. The information may comprise identification of an image classification. The at least one parameter may comprise a priority value. The information may comprise identification of at least one portion of an image. The at least one parameter may comprise information to prevent the reduction in accuracy of the at least one first aspect or task. The information may comprise identification of multiple subsets of classes, and where the at least one first aspect or task may comprise one of the multiple subsets. The at least one parameter may comprise a percent or value less than one. The at least one parameter may comprise a compression value or setting. The information may comprise an image location on an image, and the at least one parameter may comprise a compression setting for the image location. The image location may comprise at least one of a center (e.g. a center of an image or a center of a bounding box) or a bounding box. The at least one parameter may comprise a pixel value. The at least one parameter may comprise a degradation value or degradation range. The at least one memory and the computer program code may be further configured to, with the at least one processor, cause the apparatus to receive a request from the second device, where the request is configured to request the apparatus to send the information to the second device. The request may identify multiple priorities for the at least one parameter. The request may identify different aspects or tasks of the neural network including the at least one first aspect or task. The request may comprise a map. The second device may send a first different compressed neural network to the apparatus with the request and with a map associating the first different compressed neural network and the at least one parameter. The apparatus may further include where at least one second aspect or task in the compressed neural network has a reduction in accuracy more than a reduction in accuracy of the at least one first aspect or task.

An example embodiment may be provided with a non-transitory program storage device readable by a machine, tangibly embodying a program of instructions executable by the machine for performing operations, the operations comprising: transmitting information from a first device to a second device, where the information comprises at least one parameter configured to be used for compression of a neural network, where the at least one parameter is in regard to at least one first aspect or task of the neural network; and receiving a compressed neural network by the first device from the second device, where the compressed neural network has been compressed based on the at least one parameter.

The operations may further include using the compressed neural network by the first device in regard to an image. The at least one first aspect or task may comprise an individual aspect or task of the neural network. The information may comprise identification of the at least one first aspect or task. The information may comprise identification of an image classification. The at least one parameter may comprise a priority value. The information may comprise identification of at least one portion of an image. The at least one parameter may comprise information to prevent the reduction in accuracy of the at least one first aspect or task. The information may comprise identification of multiple subsets of classes, and where the at least one first aspect or task may comprise one of the multiple subsets. The at least one parameter may comprise a percent or value less than one. The at least one parameter may comprise a compression value or setting. The information may comprise an image location on an image, and the at least one parameter may comprise a compression setting for the image location. The image location may comprise at least one of a center (e.g. a center of an image or a center of a bounding box) or a bounding box. The at least one parameter may comprise a pixel value. The at least one parameter may comprise a degradation value or degradation range. The operations may further comprise receiving a request by the first device from the second device, where the request is configured to request the first device to send the information to the second device. The request may identify multiple priorities for the at least one parameter. The request may identify different aspects or tasks of the neural network including the at least one first aspect or task. The request may comprise a map. The second device may send a first different compressed neural network to the first device with the request and with a map associating the first different compressed neural network and the at least one parameter. The non-transitory program storage device may further include where at least one second aspect or task in the compressed neural network has a reduction in accuracy more than a reduction in accuracy of the at least one first aspect or task.

An example embodiment may be provided with an apparatus comprising: means for transmitting information from the apparatus to a second device, where the information comprises at least one parameter configured to be used for compression of a neural network, where the at least one parameter is in regard to at least one first aspect or task of the neural network; and means for receiving a compressed neural network from the second device, where the compressed neural network has been compressed based on the at least one parameter.

The apparatus may further include means for using the compressed neural network in regard to an image. The at least one first aspect or task may comprise an individual aspect or task of the neural network. The information may comprise identification of the at least one first aspect or task. The information may comprise identification of an image classification. The at least one parameter may comprise a priority value. The information may comprise identification of at least one portion of an image. The at least one parameter may comprise information to prevent the reduction in accuracy of the at least one first aspect or task. The information may comprise identification of multiple subsets of classes, and where the at least one first aspect or task may comprise one of the multiple subsets. The at least one parameter may comprise a percent or value less than one. The at least one parameter may comprise a compression value or setting. The information may comprise an image location on an image, and the at least one parameter may comprise a compression setting for the image location. The image location may comprise at least one of a center (e.g. a center of an image or a center of a bounding box) or a bounding box. The at least one parameter may comprise a pixel value. The at least one parameter may comprise a degradation value or degradation range. The apparatus may further include means for receiving a request from the second device, where the request is configured to request the apparatus to send the information to the second device. The request may identify multiple priorities for the at least one parameter. The request may identify different aspects or tasks of the neural network including the at least one first aspect or task. The request may comprise a map. The second device may send a first different compressed neural network to the apparatus with the request and with a map associating the first different compressed neural network and the at least one parameter. The apparatus may further include where at least one second aspect or task in the compressed neural network has a reduction in accuracy more than a reduction in accuracy of the at least one first aspect or task.

An example apparatus may include circuitry configured to receive information from a second device, where the information comprises at least one parameter configured to be used for compression of a neural network, where the at least one parameter is in regard to at least one first aspect or task of the neural network; and circuitry configured to compress the neural network, where the neural network is compressed based, at least partially, upon the at least one parameter received from the second device.

An example apparatus may include circuitry configured to transmit information from the apparatus to a second device, where the information comprises at least one parameter configured to be used for compression of a neural network, where the at least one parameter is in regard to at least one first aspect or task of the neural network; and circuitry configured to receive a compressed neural network from the second device, where the compressed neural network has been compressed based on the at least one parameter. The apparatus may further include where at least one second aspect or task in the compressed neural network has a reduction in accuracy more than a reduction in accuracy of the at least one first aspect or task.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   at least one processor; and
   at least one memory storing instructions that, when executed by the at least one processor, cause the apparatus at least to:
   receive with a first device information from a second device, where the information comprises at least one parameter configured to be used for compression of a neural network, where the at least one parameter is in regard to at least one first aspect or task of the neural network, and wherein the information further comprises at least one of the following: a sparsification performance map, or a unification performance map, or a decomposition performance map according to which the compression is to be implemented;
   wherein the information comprising the at least one parameter configured to be used for compression of the neural network received with the first device from the second device comprises a mapping of, for each class of a plurality of classes, and for each compression threshold of a plurality of compression thresholds of the neural network, a respective compression threshold of the neural network of the plurality of compression thresholds of the neural network to a respective separate accuracy of a plurality of accuracies of the neural network, wherein the respective separate accuracy of the neural network corresponds to whether samples belong to a class predicted with the neural network for the samples.

2. The apparatus as in claim 1, where the at least one first aspect or task comprises an individual aspect or task of the neural network.

3. The apparatus as in claim 1, wherein a compressed neural network has been compressed based on the information comprising the at least one parameter configured to be used for compression of the neural network received from the second device, and wherein use of the compressed neural network results in an accuracy of at least one second aspect or task of the neural network being less than an accuracy of the at least one first aspect or task.

4. The apparatus as in claim 1, wherein:
   a compressed neural network has been compressed based on the sparsification performance map that specifies a mapping between different sparsification thresholds and corresponding respective accuracies of the neural network resulting from the different sparsification thresholds; and
   the information received from the second device comprises the sparsification performance map that specifies the mapping between the different sparsification thresholds and corresponding respective accuracies of the neural network resulting from the different sparsification thresholds.

5. The apparatus as in claim 4, where the resulting accuracies are received from the second device within the sparsification performance map as part of the mapping between the different sparsification thresholds and corresponding respective accuracies of the neural network resulting from the different sparsification thresholds separately for different aspects, including the at least one first aspect or task of the neural network, of an output of the neural network.

6. The apparatus as in claim 4, where the sparsification performance map received from the second device comprises, for each class of the plurality of classes, a mapping of each of the different sparsification thresholds to a separate accuracy of the plurality of accuracies.

7. The apparatus as in claim 6, where the sparsification performance map received from the second device comprises a mapping of each of the different sparsification thresholds to a separate overall accuracy of the neural network that considers each of the plurality of classes among a plurality of overall accuracies of the neural network that consider each of the plurality of classes.

8. The apparatus as in claim 6, where each of the classes predicted with the neural network is ordered based on an output order of the neural network, or an order specified during training of the neural network.

9. The apparatus as in claim 1, wherein:
   a compressed neural network has been compressed based on the unification performance map that specifies a mapping between different unification thresholds and corresponding respective accuracies of the neural network resulting from the different unification thresholds; and
   the information received from the second device comprises the unification performance map that specifies the mapping between the different unification thresholds and the corresponding respective accuracies of the neural network resulting from the different unification thresholds.

10. The apparatus as in claim 9, where the resulting accuracies are received from the second device within the unification performance map as part of the mapping between the different unification thresholds and the corresponding respective accuracies of the neural network resulting from the different unification thresholds separately for different aspects, including the at least one first aspect or task of the neural network, of an output of the neural network.

11. The apparatus as in claim 9, where the unification performance map received from the second device comprises, for each class of the plurality of classes, a mapping of each of the different unification thresholds to a separate accuracy of the plurality of accuracies.

12. The apparatus as in claim 11, where the unification performance map received from the second device comprises a mapping of each of the different unification thresholds to a separate overall accuracy of the neural network that considers each of the plurality of classes among a plurality of overall accuracies of the neural network that consider each of the plurality of classes.

13. The apparatus as in claim 11, where each of the classes predicted with the neural network is ordered based on an output order of the neural network, or an order specified during training of the neural network.

14. The apparatus as in claim 1, wherein:
   a compressed neural network has been compressed based on the decomposition performance map that specifies a mapping between different mean squared error (MSE) thresholds between decomposed tensors and their respective original tensors and corresponding respective accuracies of the neural network resulting from the different MSE thresholds; and the information received from the second device comprises the decomposition performance map that specifies the mapping between the different MSE thresholds between decomposed tensors and their respective original tensors and the corresponding respective accuracies of the neural network resulting from the different MSE thresholds.

15. The apparatus as in claim 14, where the resulting accuracies are received from the second device within the decomposition performance map as part of the mapping between the different MSE thresholds between decomposed tensors and their respective original tensors and the corresponding respective accuracies of the neural network resulting from the different MSE thresholds separately for different aspects, including the at least one first aspect or task of the neural network, of an output of the neural network.

16. The apparatus as in claim 14, where the decomposition performance map received from the second device comprises, for each class of the plurality of classes, a mapping of each of the different MSE thresholds to a separate accuracy of the plurality of accuracies.

17. The apparatus as in claim 16, where the decomposition performance map received from the second device comprises a mapping of each of the different MSE thresholds to a separate overall accuracy of the neural network that considers each of the plurality of classes among a plurality of overall accuracies of the neural network that consider each of the plurality of classes.

18. The apparatus as in claim 16, where each of the classes predicted with the neural network is ordered based on an output order of the neural network, or an order specified during training of the neural network.

19. The apparatus of claim 1, wherein;

the information received from the second device indicates that: a first classification determined with the neural network is assigned a first priority regarding a first loss of the neural network when the neural network is compressed, and a second classification determined with the neural network is assigned a second priority regarding a second loss of the neural network when the neural network is compressed, wherein the first priority is higher than the second priority, and a compressed neural network has been compressed based on the first priority and the second priority such that the first loss of the neural network when the neural network is compressed based on the first classification is less than the second loss of the neural network when the neural network is compressed based on the second classification.

20. The apparatus of claim 1, wherein the information received from the second device indicates that the at least one first aspect or task of the neural network relating to an item in an image should have no loss.

21. The apparatus of claim 1, wherein the information received from the second device indicates that the at least one first aspect or task of the neural network relating to an item in an image should have a loss that is no less than a predetermined level of degradation.

22. The apparatus of claim 1, wherein the information received from the second device indicates that an area within a boundary surrounding an item of an image is permitted an amount of degradation up to a limit, wherein the amount of degradation is related to the at least one first aspect or task of the neural network.

23. The apparatus of claim 22, wherein the information received from the second device indicates that an another area outside the boundary surrounding the item of the image, and within another boundary surrounding the item of an image is permitted another amount of degradation up to another limit that is higher than the limit, wherein the another amount of degradation is related to the at least one first aspect or task of the neural network.

24. The apparatus of claim 1, wherein the apparatus is further caused to:

receive, from the second device, a request for the neural network;

transmit, to the second device, a reply to the request for the neural network, wherein the reply to the request for the neural network comprises a request for the information comprising the at least one parameter configured to be used for compression of the neural network; and receive, from the second device, a value of the at least one parameter configured to be used for compression of the neural network, in response to transmitting, to the second device, the reply to the request for the neural network;

wherein a compressed neural network has been compressed based on the value of the at least one parameter received from the second device.

25. The apparatus of claim 1, wherein the apparatus is further caused to:

receive, from the second device, a request for the neural network;

transmit, to the second device, a map associating a compression of the neural network and the at least one parameter; and receive, from the second device, a value of the at least one parameter configured to be used for the compression of the neural network, in response to transmitting, to the second device, the map associating the compression of the neural network and the at least one parameter;

wherein a compressed neural network has been compressed based on the value of the at least one parameter received from the second device.

26. The apparatus of claim 1, the compression threshold of the neural network is used to determine an amount by which the neural network is compressed.

27. The apparatus of claim 1, wherein the apparatus is further caused to:

select at least one of the compression thresholds based on at least one of: a channel bandwidth, or a consideration of at least one computational resource associated with the apparatus, or a consideration of at least one memory resource associated with the apparatus, or a consideration of at least power resource associated with the apparatus;

wherein a compressed neural network has been compressed based on the at least one of the compression thresholds that is selected based on at least one of: the channel bandwidth, or the consideration of the at least one computational resource associated with the apparatus, or the consideration of the at least one memory resource associated with the apparatus, or the consideration of the at least power resource associated with the apparatus.

28. The apparatus of claim 1, wherein a compressed neural network has been compressed based on the information comprising the at least one parameter configured to be used for compression of the neural network received from the second device including the mapping of, for each class of the plurality of classes, and for each compression threshold of the plurality of compression thresholds of the neural network, the respective compression threshold of the neural network of the plurality of compression thresholds of the neural network to the respective separate accuracy of the plurality of accuracies of the neural network.

29. The apparatus of claim 1, wherein a compressed neural network has been compressed based on the information comprising the at least one parameter configured to be used for compression of the neural network received from the second device such that a degradation of accuracy of the neural network associated with compression of the neural network based on a first class of the plurality of classes is less than a degradation of accuracy of the neural network associated with compression of the neural network based on a second class of the plurality of classes.

30. The apparatus of claim 28, wherein the at least one memory storres instructions that, when executed by the at least one processor, cause the apparatus at least to:
  transmit the compressed neural network to the second device.

31. The apparatus of claim 30, wherein the compressed neural network is transmitted to the second device over a communication network.

32. An apparatus comprising:
  at least one processor; and
  at least one memory storing instructions that, when executed by the at least one processor, cause the apparatus at least to:
  transmit information from the apparatus to a second device, where the information comprises at least one parameter configured to be used for compression of a neural network, where the at least one parameter is in regard to at least one first aspect or task of the neural network, and wherein the information further comprises at least one of the following: a sparsification performance map, or a unification performance map, or a decomposition performance map according to which the compression is to be implemented, wherein the apparatus is associated with a first device;

wherein the information comprising the at least one parameter configured to be used for compression of the neural network transmitted from the first device to the second device comprises a mapping of, for each class of a plurality of classes, and for each compression threshold of a plurality of compression thresholds of the neural network, a respective compression threshold of the neural network of the plurality of compression thresholds of the neural network to a respective separate accuracy of a plurality of accuracies of the neural network, wherein the respective separate accuracy of the neural network corresponds to whether samples belong to a class predicted with the neural network for the samples.

33. A method comprising:
receiving with a first device information from a second device, where the information comprises at least one parameter configured to be used for compression of a neural network, where the at least one parameter is in regard to at least one first aspect or task of the neural network, and wherein the information further comprises at least one of the following: a sparsification performance map, or a unification performance map, or a decomposition performance map according to which the compression is to be implemented;
wherein the information comprising the at least one parameter configured to be used for compression of the neural network received with the first device from the second device comprises a mapping of, for each class of a plurality of classes, and for each compression threshold of a plurality of compression thresholds of the neural network, a respective compression threshold of the neural network of the plurality of compression thresholds of the neural network to a respective separate accuracy of a plurality of accuracies of the neural network, wherein the respective separate accuracy of the neural network corresponds to whether samples belong to a class predicted with the neural network for the samples.

\* \* \* \* \*